(12) United States Patent
Gehani et al.

(10) Patent No.: US 9,164,576 B2
(45) Date of Patent: Oct. 20, 2015

(54) CONFORMANCE PROTOCOL FOR HETEROGENEOUS ABSTRACTIONS FOR DEFINING USER INTERFACE BEHAVIORS

(75) Inventors: Samir Gehani, Cupertino, CA (US); Tyler C. Rayner, San Jose, CA (US)

(73) Assignee: Apple Inc., Cupertino, CA (US)

( * ) Notice: Subject to any disclaimer, the term of this patent is extended or adjusted under 35 U.S.C. 154(b) by 600 days.

(21) Appl. No.: 13/231,762

(22) Filed: Sep. 13, 2011

(65) Prior Publication Data

US 2013/0067361 A1 Mar. 14, 2013

(51) Int. Cl.
G06F 3/048 (2013.01)
G06F 3/00 (2006.01)
G06F 9/44 (2006.01)
G06F 3/0481 (2013.01)

(52) U.S. Cl.
CPC .. G06F 3/00 (2013.01); G06F 8/34 (2013.01); G06F 3/04817 (2013.01)

(58) Field of Classification Search
USPC ................................................ 715/762, 763
See application file for complete search history.

(56) References Cited

U.S. PATENT DOCUMENTS

| | | | |
|---|---|---|---|
| 5,359,712 A | 10/1994 | Cohen et al. | |
| 5,481,741 A * | 1/1996 | McKaskle et al. | 345/522 |
| 5,509,116 A * | 4/1996 | Hiraga et al. | 715/762 |
| 5,566,295 A * | 10/1996 | Cypher et al. | 715/763 |
| 5,636,340 A | 6/1997 | Bonneau et al. | |
| 5,659,793 A | 8/1997 | Escobar et al. | |
| 5,692,117 A | 11/1997 | Berend et al. | |
| 5,715,413 A * | 2/1998 | Ishai et al. | 715/825 |
| 5,760,788 A * | 6/1998 | Chainini et al. | 345/474 |
| 5,929,867 A | 7/1999 | Herbstman et al. | |
| 5,963,203 A | 10/1999 | Goldberg et al. | |
| 5,966,691 A | 10/1999 | Kibre et al. | |
| 5,999,195 A | 12/1999 | Santangeli | |
| 6,118,455 A | 9/2000 | Hidaka et al. | |
| 6,184,879 B1 | 2/2001 | Minemura et al. | |
| 6,388,683 B1 * | 5/2002 | Ishai et al. | 715/765 |
| 6,469,711 B2 | 10/2002 | Foreman et al. | |
| 6,480,203 B1 | 11/2002 | Carter et al. | |
| 6,504,545 B1 | 1/2003 | Browne et al. | |
| 6,512,522 B1 | 1/2003 | Miller et al. | |
| 6,684,385 B1 * | 1/2004 | Bailey et al. | 717/109 |

(Continued)

OTHER PUBLICATIONS

Invitation to Pay Additional Fee and, Where Applicable, Protest Fee, partial search report, Feb. 27, 2013, 74 pages.

(Continued)

*Primary Examiner* — Dino Kujundzic
(74) *Attorney, Agent, or Firm* — Novak Druce Connolly Bove + Quigg LLP

(57) ABSTRACT

An authoring system for building an application that has a set of graphical objects and is for performing several operations on several graphical objects in response to several user interaction events. The authoring system includes (1) a first set of tools for defining a first description of a first operation that is to be performed on a first graphical object and (2) a second set of tools for defining a second description of a second operation that is to be performed on a second graphical object. The second set of tools provides at least one different tool for defining the second description than the first set of tools provides for defining the first description. The authoring system also includes a conformance module for modifying at least one of the received descriptions to ensure that the descriptions of both the first and second operations are in a uniform description format.

18 Claims, 25 Drawing Sheets

(56) References Cited

U.S. PATENT DOCUMENTS

| | | | |
|---|---|---|---|
| 6,701,513 B1* | 3/2004 | Bailey | 717/109 |
| 6,747,650 B2 | 6/2004 | Turner et al. | |
| 6,828,971 B2 | 12/2004 | Uesaki et al. | |
| 6,867,787 B1 | 3/2005 | Shimizu et al. | |
| 6,928,613 B1 | 8/2005 | Ishii et al. | |
| 6,934,696 B1* | 8/2005 | Williams et al. | 706/47 |
| 6,947,044 B1 | 9/2005 | Kulas | |
| 6,956,574 B1 | 10/2005 | Cailloux et al. | |
| 7,106,275 B2 | 9/2006 | Brunner et al. | |
| 7,199,805 B1 | 4/2007 | Langmacher et al. | |
| 7,336,264 B2 | 2/2008 | Cajolet et al. | |
| 7,336,280 B2 | 2/2008 | Nelson et al. | |
| 7,370,315 B1* | 5/2008 | Lovell et al. | 717/100 |
| 7,483,041 B2 | 1/2009 | Langmacher et al. | |
| 7,594,180 B1 | 9/2009 | Langmacher et al. | |
| 7,607,137 B2 | 10/2009 | Hauser et al. | |
| 7,643,037 B1 | 1/2010 | Langmacher et al. | |
| 7,917,755 B1 | 3/2011 | Giliyaru et al. | |
| 8,046,679 B2 | 10/2011 | Neil | |
| 8,140,894 B2* | 3/2012 | Thomson et al. | 714/15 |
| 2002/0015050 A1 | 2/2002 | Kawai et al. | |
| 2003/0146915 A1 | 8/2003 | Brook et al. | |
| 2004/0111673 A1 | 6/2004 | Bowman et al. | |
| 2005/0231512 A1 | 10/2005 | Niles et al. | |
| 2006/0150148 A1* | 7/2006 | Beckett et al. | 717/109 |
| 2006/0248451 A1 | 11/2006 | Szyperski et al. | |
| 2007/0159487 A1 | 7/2007 | Felt | |
| 2008/0072166 A1 | 3/2008 | Reddy | |
| 2008/0184139 A1* | 7/2008 | Stewart et al. | 715/762 |
| 2009/0309881 A1 | 12/2009 | Zhao et al. | |
| 2010/0064222 A1 | 3/2010 | Tilton | |
| 2010/0107079 A1 | 4/2010 | Langmacher et al. | |
| 2010/0146425 A1* | 6/2010 | Lance et al. | 715/769 |
| 2010/0201692 A1 | 8/2010 | Niles et al. | |
| 2011/0181521 A1 | 7/2011 | Reid et al. | |
| 2012/0050309 A1 | 3/2012 | Tsuchida et al. | |
| 2013/0132875 A1 | 5/2013 | Allen et al. | |

OTHER PUBLICATIONS

U.S. Appl. No. 13/221,287, filed Aug. 30, 2011, Gehani, Samir, et al.
U.S. Appl. No. 13/231,767, filed Sep. 13, 2011, Gehani, Samir, et al.
U.S. Appl. No. 13/231,770, filed Sep. 13, 2011, Gehani, Samir, et al.
Author Uknown, "LiveType 2: User Manual", Month Unknown, 2005, pp. 1-157, Apple Inc., USA.
Jones, Jerry, "India Pro Special Effects Titler, " The Ken Stone Index, Software Review, Apr. 1, 2002 Month Unknown, pp. 1-18, USA.
Stone, Ken, "The Basics—Editing with Transitions in Final Cut Pro," The Ken Stone Index, The Basics—Getting Started, Jun. 12, 2001, pp. 1-8, USA.
Stevenson, Nancy, et al., "Special Edition—Using Microsoft PowerPoint 97,"Month Unknown, 1997, 18 pages, Que Corporation, Indianapolis, USA.
Author Unknown, "Using Adobe Flash CS4 Professional," Updated Mar. 5, 2009, 474 pages, Adobe Systems Incorporated, San Jose, California, USA.
Author Unknown, "Adobe Director 11: User Guide," Month Unknown, 2008, 498 pages, Adobe Systems Incorporated, San Jose, California, USA.
Author Unknown, "Adobe Premiere Pro CS3: Classroom in a Book", Month Unknown, 2008, Chapters 9 and 10, 27 pages, Adobe Systems Incorporated, San Jose, California USA.
Spencer, Mark, "Working with Keyframes in Motion, Part 1: Creating and Manipulating Keyframes," The Ken Stone Index, Feb. 11, 2005, pp. 1-7, USA.
Stone, Ken, "Motion Paths and the Bezier Handle in FCP," The Ken Stone Index, Aug. 13, 2001, pp. 1-11, USA.
Gehani, Samir et al., "Merging User Interface Behaviors", PCT/IB2012/002315 International Search Report and Written Opinion, dated May 24, 2013, filed Nov. 13, 2012, 14 pages.

* cited by examiner

CONFORMANCE PROTOCOL FOR HETEROGENEOUS ABSTRACTIONS FOR DEFINING USER INTERFACE BEHAVIORS

BACKGROUND

Designing and developing software applications for running on computing devices is a daunting task, as it requires special knowledge and skill as well as experience. Everyday users of computing devices who have the desire and creativity to build their own applications are often driven off by complex and incomprehensible coding syntaxes and unfamiliar concepts like compiling and debugging. For this reason, most people opt to purchase software applications written by professional developers and run the applications on the computing devices they own. Several application-building applications have been developed to lower the barrier to writing software applications. However, these application-building applications still bear difficulties to overcome by everyday people.

BRIEF SUMMARY

Some embodiments of the invention provide an authoring platform for authoring software applications by defining user interface (UI) behaviors, which are associations of one or more events with one or more responses. In some embodiments, an event is a user input that an authored application receives from a user of that authored application while the application is being executed. For instance, a user's clicking on a graphical item (e.g., an icon) of the application is an event that the application receives from the user. An event can also be programmatic. For instance, when a soccer game application is being executed, a graphical object representing a soccer ball colliding with another graphical object representing the goal may be programmatically defined as an event. A response is an action that the application performs in response to the received event. For instance, upon receiving the user's click on an icon, the application may enlarge the icon. Also, the soccer game application may increment the value for the score in response to an occurrence of the goal-scoring event (i.e., the soccer ball hitting the goal).

In some embodiments, an application built by the authoring platform of some embodiments includes one or more scenes. A scene in some embodiments is an interactive "page" of the application. The application can switch from one scene to another based on the user's interaction with the scene. Each scene in some embodiments includes one or more entities with which a user of the application can interact. Entities are graphical objects displayed on a display of a machine on which the application executes. For instance, entities may be graphical icons on which the user can click. The application displays the scenes in a certain order and each scene may have a different set of entities.

The authoring platform of some embodiments allows a user of the authoring platform to define events and responses and to associate the events and responses as behaviors. The authoring platform of some embodiments also allows the user of the authoring platform to associate a behavior with an entity of a scene of the authored application. The authored application performs the response associated with the event of the behavior when the event occurs on the entity while the authored application executes on a machine. For instance, the user of the authoring application defines a response that enlarges an entity. The user also defines an event that represents touching the entity with a finger of a user of an authored application. The user associates the defined response with the defined event and then defines the association of the event and response as a behavior. The user associates this behavior with an entity of a scene of an interactive application that the user is building using the authoring platform. When the user of the application touches the entity with her finger, the application performs the response by displaying the enlarged entity.

As mentioned above, the authoring platform of some embodiments allows the user of the authoring platform to associate an entity with one or more behaviors. Each behavior can include one or more events. Each event in turn can be associated with one or more responses. That is, when an event occurs on an entity while an authored application executes, the application may perform one or more responses. In some cases, these responses may be in heterogeneous types.

The heterogeneous types of responses in some embodiments include a script response, an animation response, a complied code response, an audio response, etc. A script response is a script (e.g., JavaScript) that the authored application would perform in response to receiving an event that is associated with the script response. An animation response is an animation that the authored application would perform in response to receiving an event that is associated with the animation response. For instance, the application would animate a graphical icon glow in response to user's clicking the icon or move the graphical icon from one location of a scene to another location of the scene. A compiled code response is an executable piece of program code that the authored application would invoke in response to receiving an event that is associated with the complied code response. For instance, the application would invoke a compiled C++ code to download a file from the Internet in response to receiving a click on a graphical icon. An audio response is an audio file that the authored application would playback in response to receiving an event that is associated with the audio response.

The authoring platform of some embodiments provides a protocol to facilitate communications between heterogeneous types of responses while an authoring application that performs these responses executes. In particular, the authored application translates the input and output data of a response into parameters that conform to this protocol such that output data of one type of response can be used as the input data of another type of response. For instance, the authored application translates a new position in a scene, to which an animation response moves an icon, into parameters that conform to the protocol. The authored application translates the parameters to input variables for a script response so that the script response runs its script with the input variables.

The authoring platform of some embodiments provides a tool for defining and editing behaviors. The user of the authoring platform uses this tool to define events and responses and define behaviors by associating the events and responses. For instance, the authoring platform provides a graphical user interface (GUI) referred to as a behavior editor. The behavior editor in some embodiments is for defining and editing a behavior. The behavior editor in some embodiments includes an events column, a responses column, and a script editing area. In the events column, the behavior editor lists events of the behavior that is being defined and/or edited by the behavior editor. The behavior editor lists responses. When the user of the authoring platform selects an event listed in the events column, the responses column lists the responses that are associated with the selected event. When the user of the authoring platform selects a script response listed in the responses column, the behavior editor displays the response's script content in the script editing area.

The authoring platform of some embodiments provides a tool for visually associating an entity of a scene and a behavior. For instance, the authoring platform provides a GUI that includes a scene preview area and a behaviors library. The scene preview area displays a scene of an application being built by the authoring platform. That is, scene preview area displays the entities of the scene. The behaviors library displays a list of behaviors that are represented as graphical objects. The tool in some embodiments allows the user of the authoring platform to select and drag a behavior from the behaviors library and to drop it onto an entity displayed in the scene preview area. In this manner, the user can associate an entity with a behavior visually.

The authoring platform of some embodiments provides a tool for visually combining several animation responses for an entity of a scene of an application being authored. For instance, the authoring platform provides a GUI that includes a key indices display area for displaying key-indexed graphs. A key-indexed graph in some embodiments is displayed as a line that horizontally expands the key indices display area. One end of the key-indexed graph represents the beginning of duration of the corresponding scene and the other end of the key-indexed graph represents the end of the duration. When the scene is played back, the scene will display its entities for the duration represented by the length of the key-indexed graph.

In some embodiments, the GUI allows the user of the authoring platform to place key indices (e.g., keyframes) on the key-indexed graph. A pair of key indices represents a start and an end of an animation for an entity of a scene. For instance, the first key index of a key index pair defines a first location of the entity within the scene at the beginning of a time period and the second key index of the key index pair may define a second location of the entity within the scene at the end of the time period. When the scene is played back for the time period represented by the two key indices of the pair, the entity moves from the first location at the beginning of the time period to the second location at the end of the time period. In some embodiments, the intermediate positions of the icon being moved during the time period are interpolated based on the first and the second positions. Thus, an animation response may be defined as a set of key indices placed along a key-indexed graph.

Using the combining tool, the user of the authoring platform can combine several animation responses in the key-indexed graphs when the responses are associated with the same event. As mentioned above, an animation response may be represented as a set of key indices for one or more entities of a scene. Combining several animation responses in the key-indexed graphs therefore means combining the key indices of different responses in some embodiments. The tool in some embodiments allows the user to combine responses in the key indices display area by selecting and dragging several behaviors from the behaviors library and dropping the selected behaviors on the key indices display area. Once the behaviors are dropped onto the key indices display area, the key indices of the animation responses of the behaviors appear on the key-indexed graphs.

Some embodiments provide a method for automatically detecting boundaries of a transparent area within an image, which serves as the scene preview area of the authoring platform. In some cases, the manufacturer of a device provides the user of the authoring platform with the image having a transparent area. This transparent area in the image serves as the scene preview area. That is, the entities of a scene will appear in the transparent area within the provided image. The user can tailor the scenes of the application being authored to the provided image so that the scenes are displayed correctly in the display area for the device.

However, a manufacturer may change the shape and/or size of the transparent area within the image before finalizing the design for their device or when a new version of the device is being developed. By allowing automatic detection of boundaries of the transparent area, the method of some embodiments allows the user of the authoring platform to avoid changing the scenes to keep up with the changes to the shape and/or size of the transparent area of the image. The method of some such embodiments first finds the center pixel of the image and determines whether the center pixel supports transparency. The method in some embodiments determines that the center point supports transparency when the center pixel has an alpha value that is below a certain threshold value that is less than 1.0. In these embodiments, a pixel having an alpha value that is less than the threshold value is qualified as transparent. When the center pixel is determined to be transparent, the method expands the boundaries of the transparent area from the center pixel until the boundaries hit pixels that do not have alpha values or that have alpha values greater than the threshold value. The method then uses the expanded boundaries over which to place the entities.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide an authoring platform for authoring interactive software applications by defining user interface (UI) behaviors, which are associations of one or more events with one or more responses. In some embodiments, an event is a user input that an authored application receives from a user of that authored application while the application is being executed. For instance, a user's clicking on a graphical item (e.g., an icon) of the application is an event that the application receives from the user. An event can also be programmatic. For instance, when a soccer game application is being executed, a graphical object representing a soccer ball colliding with another graphical object representing the goal may be programmatically defined as an event. A response is an action that the application performs in response to the received event. For instance, upon receiving the user's click, the application may enlarge the icon. Also, the soccer game application may increment the value for the score in response to an occurrence of the goal-scoring event (i.e., the soccer ball hitting the goal).

Figure 1:
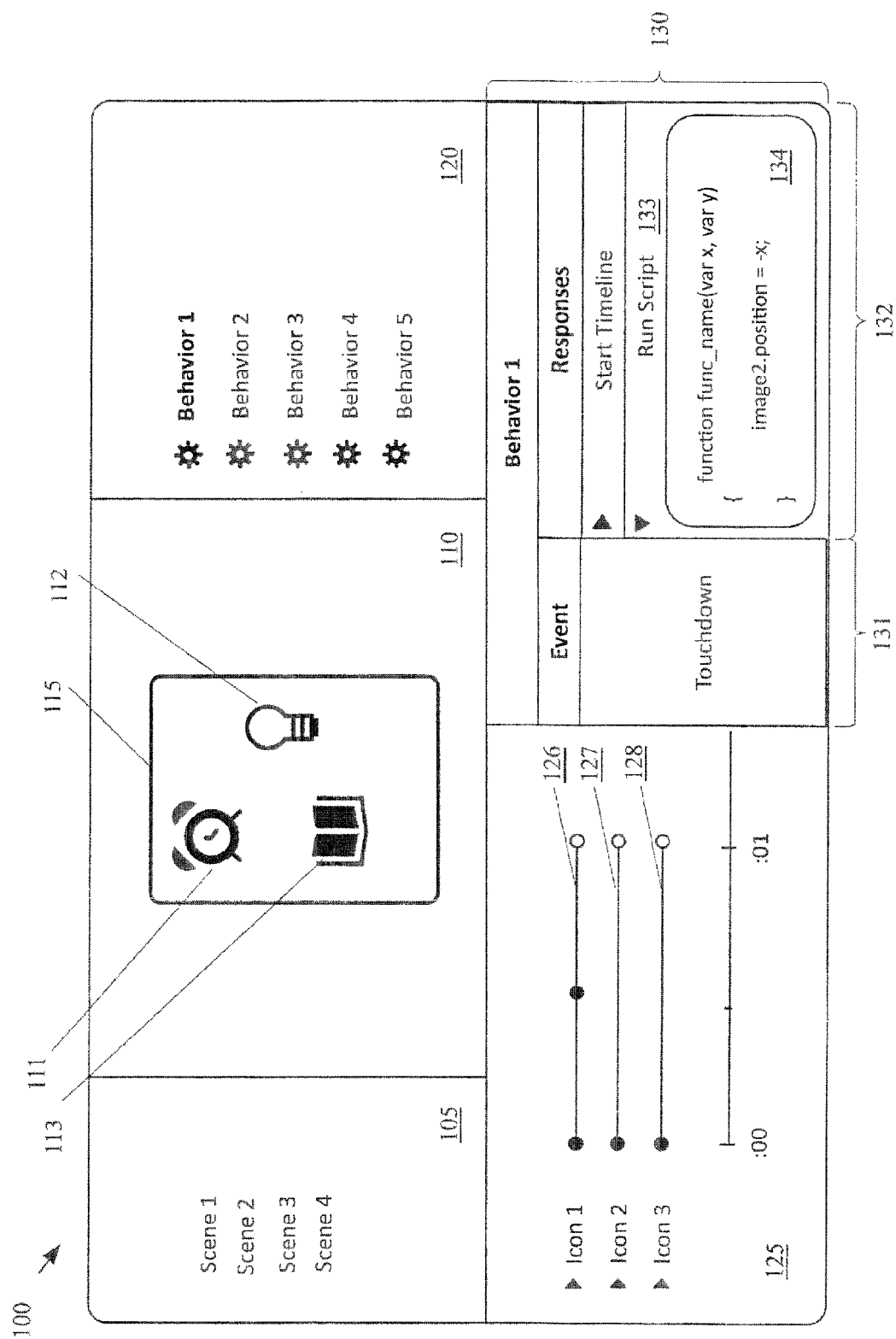
FIG. 1 conceptually illustrates a graphical user interface (GUI) of the authoring platform of some embodiments.

FIG. 1 conceptually illustrates a graphical user interface (GUI) 100 of the authoring platform of some embodiments.

Specifically, FIG. 1 illustrates several different GUI tools that the authoring platform provides. Using the tools, a user of the authoring platform can build interactive applications to run on devices. As shown, the GUI 100 includes a scenes pane 105, a scene preview area 110, a behaviors library 120, a key indices display area 125, and a behavior editor 130.

The scene preview area 110 displays a scene of the application being built. In some embodiments, an application built by the authoring platform of some embodiments includes one or more scenes. A scene in some embodiments is an interactive "page" of the application. That is, each scene includes one or more entities with which a user of the application can interact. Also, the user can move from one scene to another. Entities are graphical objects of a scene displayed on a display area of a device on which the application executes.

In some embodiments, the GUI 100 allows a user to create or modify the scene by adding or deleting entities (e.g., a graphical icon) to and from the scene preview area 110. For instance, the scene preview area 110 shows icons 111, 112, and 113, which are added to the scene preview area 110 by user by dragging and dropping these icons. In some embodiments, the scene preview area 110 also allows the user of the authoring platform to simulate a run of the scene of the application. That is, the user can execute the scene of the application in the scene preview area 110.

In some embodiments, the scene preview area 110 includes a canvas 115. The canvas 110 in some embodiments is an area that has the size and the shape of the display area of a device on which the scenes of the application will be displayed. As will be described below in Section IV, the authoring platform of some embodiments automatically detects boundaries of the transparent area within an image that is used as a canvas.

The scenes pane 105 in some embodiments is an area of the GUI 100 that lists the scenes of an application that is being authored by the authoring platform. The scenes pane 105 lists a different set of scenes whenever a scene is added to or deleted from the application. The scenes pane 105 lists the scenes by the scenes' names in some embodiments. For instance, the scenes pane 105 displays four scene scenes 1-4 as shown. In some embodiments, when the user selects a scene in the scenes pane 105, the GUI 100 displays the scene in the scene display area 110.

The behaviors library 120 lists behaviors by the behaviors' names. For instance, the behaviors library 120 lists five behaviors 1-5 as shown. The GUI 100 of some embodiments allows the user of the authoring platform to graphically associate a behavior listed in the behaviors library 120 with an entity displayed in the scene preview area 115 by, for example, dragging the behavior from the behaviors library 120 and dropping onto the entity. Graphically associating a behavior with an entity of a scene will be further described below by reference to FIG. 6.

The key indices display area 125 displays a key-indexed graph for each of the entities of a scene that is being edited in the scene preview area 110. For instance, the key indices display area 125 displays three key-indexed graphs 126-128 for the icons 111-113, respectively. A key-indexed graph can be expanded to sub-key-indexed graphs for properties of the corresponding entity. Key-indexed graphs and sub-key-indexed graphs for entities will be described further below by reference to FIG. 8. In some embodiments, the GUI 100 allows the user of the authoring platform to animate properties of an entity by adding and manipulating key indices on the key-indexed graph and sub-key-indexed graphs for the entity. Also, different responses of different behaviors may be merged in the key indices display area 125. Key indices and merging responses will be described further below by reference to FIGS. 8 and 9.

The behavior editor 130 allows a user of the authoring platform to create and modify behaviors for an application being built by the authoring platform. As shown, the behavior editor 130 in some embodiments includes two columns 131 and 132 for listing events and responses, respectively. The events column 131 lists one or more events of the behavior being edited. The responses column 132 lists responses that are associated with events listed in the events column 132. In some embodiments, a response in the response column is displayed in an expandable row. For instance, a response row for the response 133 is expanded to include a script editing area 134 in which the user can modify or create scripts. Further details about a behavior editor will be described below by reference to FIGS. 7, 14, and 15.

As shown, the GUI 100 includes several different parts. However, not all of these different parts need to appear at a time for the GUI 100 to be functional. That is, one or more subsets of the parts of the GUI 100 may appear at a given time. Moreover, not all of these different parts need to appear in the same window. Each of the parts may have its own window that can be manipulated by the user separately from the GUI 100. Also, one or more subsets of the parts may appear in one window. For instance, the behaviors library 120 and the behavior editor 130 may appear in the same window that is not the window of the GUI 100.

Figure 2:
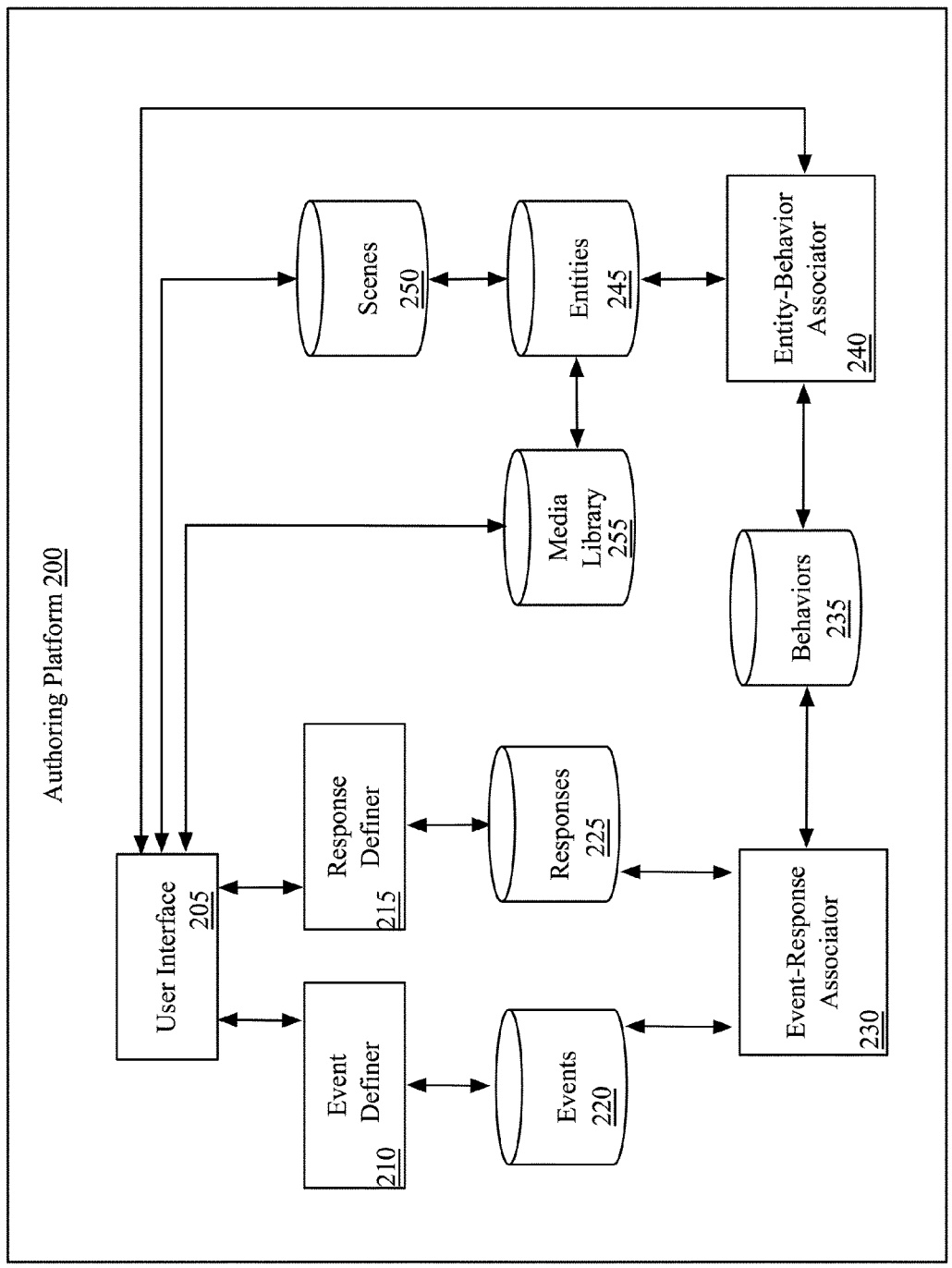
FIG. 2 illustrates an example architecture of an authoring platform that defines behaviors.

FIG. 2 illustrates an example architecture of an authoring platform 200 that defines behaviors. The authoring platform allows a user to build an application using behaviors. A built application will perform the responses defined in the behaviors when the application receives one or more events that are defined to be associated with the behaviors. An example of such responses may be displaying an animation in response to receiving an event such as a user's click on a GUI item. The application might be an interactive game, an office application, etc. In some embodiments, the authoring platform is used to develop applications for specific devices (e.g., specific smartphones, tablets, laptops or desktops, etc.) or specific operating systems (which may run on specific devices such as smartphones, tablets, laptops, desktops, etc.). As shown, the authoring platform of some embodiments includes a user interface 205, an event definer 210, a response definer 215, an events repository 220, a responses repository 225, an event-response associator 230, a behaviors repository 235, an entity-behavior associator 240, an entities repository 245, a scenes repository 250, and a media library 255.

An application built by the authoring platform of some embodiments includes one or more scenes. A scene in some embodiments includes one or more entities with which a user of the application can interact. Entities in some embodiments are graphical objects displayed on a display of a machine on which the application executes. For instance, entities may be graphical icons with which the user of the application can interact by e.g., clicking on them. The entities may represent different media pieces including icons, textual information, movies, audio clips, etc. The application displays the scenes in a certain order and each scene may have a different set of entities. When an event defined in a behavior associated with an entity occurs with respect to the entity, the authored application that includes the entity runs the response(s) associated with the event in response to the occurrence of the event.

The scenes repository 250, which is a cache or other persistent storage medium in some embodiments, stores scenes that may become part of the authored applications. The user of the authoring platform (e.g., an application developer) creates scenes in which one or more graphical objects are displayed. The graphical objects of some embodiments may include various media pieces such as icons, textual information, movies, audio clips, etc. Within an application developed using the authoring platform 200, these might appear as selectable items or just displayed items. As mentioned above, these graphical objects of a scene are also referred to as entities.

The media library 255 stores the media pieces. These media pieces are created by the application developers or brought into the media library 255 by the application developers in some embodiments. The media pieces may be brought into the scenes and become part of the scenes. Once the media pieces are brought into the scenes, they are represented by the entities related to the scenes. The entities repository 245 stores information regarding the media pieces that the entities represent. In some cases, an entity is stored as a data structure that has a reference to one or more media pieces that are represented by the entity. Also, this data structure in some embodiments has a reference to the behaviors that are associated with the entity as will be described below.

The authoring platform 200 provides the user with the user interface 205 through which the user can input data for authoring the application. The user can specify events and responses and associate the events and responses through the user interface. The user interface feeds the received input data to other modules of the authoring platform 200. For instance, the user interface 205 sends the received data to the event definer 210 and the response definer 215.

The event definer 210 defines events based on the received data. For instance, the event definer defines an event called "goalScored" which encapsulates one graphical object representing a soccer ball colliding with another graphical object representing a goal. In some embodiments, the event definer creates events by augmenting pre-defined events with conditions. Examples of pre-defined events include a mouse-down and a mouse-up, which represent user's holding down a mouse button and releasing mouse button, respectively. The conditions will provide additional constraints to meet in order to trigger responses that will be associated with the pre-defined events. The event definer 210 stores and retrieves the defined or modified events in the events repository 220, which is a cache or other persistent storage medium in some embodiments.

The response definer 215 defines different types of responses based on the received data. The types of responses in some embodiments include a script response, an animation response, a complied code response, an audio response, etc. A script response is a script (e.g., JavaScript) that the authored application runs in response to receiving an event that is associated with the script response. An animation response is an animation that the authored application runs in response to an event that is associated with the animation response. For instance, an animation response will cause a graphical icon glow in response to user's clicking the icon. A compiled code response is an executable piece of program code that the authored application would invoke in response to receiving an event that is associated with the complied code response. For instance, the application invokes a compiled code (e.g., C++, C#, etc.) to download a file from the Internet in response to receiving a click on a graphical icon. An audio response is an audio file that the authored application would playback in response to receiving an event that is associated with the audio response.

In some embodiments, the response definer 215 defines these different types of responses in such a way that the responses of different types can communicate with each other. That is, for instance, the response definer 215 utilizes a protocol (or a format) to which the input and output data of each type of response conform so that the output of one type of response (e.g., an animation response) can be used as the input to another type of response (e.g., a script response). In other words, the response definer 215 describes the input and output data of different types of responses in a unified protocol or format so that the responses of different types can use each other's output data as the input data. For example, the response definer 215 translates the coordinates of an icon that is to be animated by an animation response from one format into a unified format. These coordinates described in the unified format are fed into a script response, which will translate the coordinates into another format that the script of the script response can use. Such unified protocol is referred to as a conformance protocol or a conformance format throughout this Specification.

In some embodiments, the conformance protocol is a format for one particular type of response. That is, the input and output of this particular type of response does not have to be translated while other types of responses have to have their input and output translated into the format for the particular type of response.

In some embodiments, the response definer 215 also defines response handlers for different types of responses. These handlers become part of authored applications along with the corresponding responses. When an authored application is running, these response handlers will parameterize the inputs and outputs of the responses using the conformance protocol so that responses of different types can communicate with each other. In this manner, the authored application can perform responses of different types that are associated with an event. For instance, an event is associated with an animation response and a script response. The animation response is defined to move a graphical icon to another position in response to an event. A handler for the animation response extracts the new position of the icon and parameterizes it into two values indicating the x and y coordinates of the center of the icon using the conformance protocol. A handler for the script response receives the two values and translates them into some other values of different types, which may be understood by the script response. The script response runs with the values translated from the values written in the conformance protocol as inputs. Further details about response handlers at runtime will be described below by reference to FIG. 3. The response definer 215 stores defined responses and response handlers in the responses repository 225, which is cache or other persistent storage mediums in some embodiments.

The event-response associator 230 associates an event with one or more responses based on the received data. That is, the event-response associator 230 defines behaviors according to the user's specification. In some embodiments, a behavior may include two or more events, each of which may be associated with responses. An event may be associated with responses of different types. For instance, a mouse-down event may be associated with an animation response and a script response. The event-response associator 230 stores the defined behaviors in the behaviors repository 235, which is a cache or other persistent storage medium in some embodiments.

The entity-behavior associator 240 associates an entity with one or more behaviors based on the received data. The entity-behavior associator 240 of some embodiments stores the associations of behaviors and entities in the entities repository 245.

Figure 3:
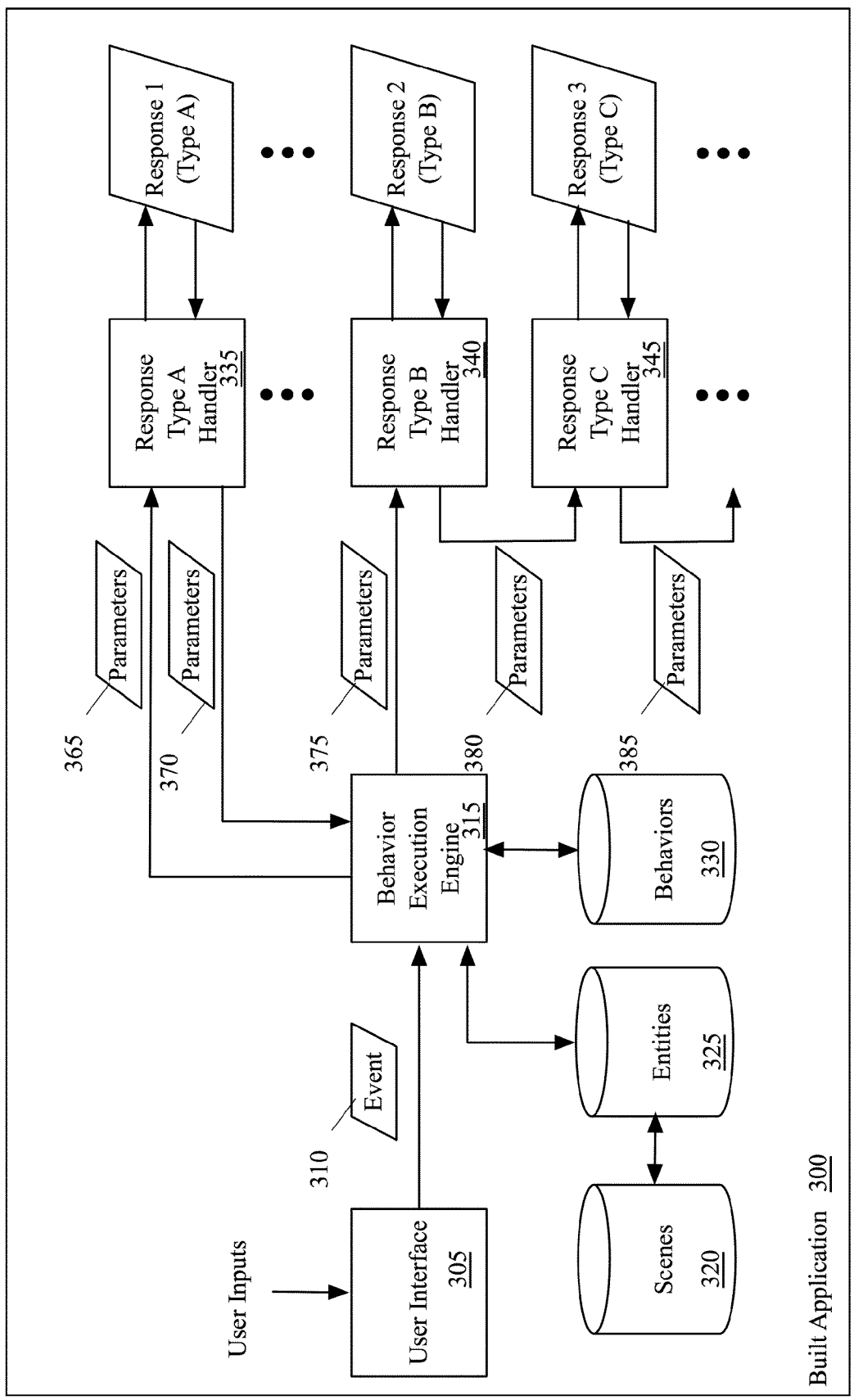
FIG. 3 illustrates example architecture of an application built by an authoring platform of some embodiments.

FIG. 3 illustrates example architecture of an application 300 built by the authoring platform 200 described above by reference to FIG. 2. Specifically, this figure illustrates that the application 300 performs several responses of different types in response to receiving an event from a user of the application. As shown, the built application 300 includes a user interface 305, a behavior execution engine 315, a scenes repository 320, an entities repository 325, a behaviors repository 330. The application 300 also includes response handlers 335-345.

The user interface 305 receives user inputs. Specifically, the user interface in some embodiments encapsulates the user's interaction with the application as event formats. For instance, when the user touches a certain part of a display device that displays a scene of the application, the user interface 305 detects the touch and generates a corresponding event (e.g., a touchdown event). In some embodiments, the user interface 305 does not detect and translate the user's interactions. Instead, the user interface 305 receives encapsulation of user's interaction from the operating system of the device on which the application is being executed. In these embodiments, the user interface 305 translates the encapsulation into an event format that the behavior execution engine 315 can understand. The user interface 305 sends events to the behavior execution engine 315. An event in some embodiments is a piece of data that includes information regarding the type of event and location of the user interaction on the current scene, etc.

The scenes repository 320 stores all scenes that the application 300 includes. In some embodiments, the scenes are stored as data structures that have references to entities that each scene includes. The entities repository 325 stores all entities that all scenes of the application include. The behaviors repository 330 stores all behaviors (i.e., associations of events and responses) that are associated with entities of the application. The repositories 320, 325, and 330 each may be a cache or other persistent storage medium in some embodiments.

The behaviors execution engine 315 selects one or more behaviors based on the received event and notifies response handlers according to the responses defined in the selected behavior(s). Upon receiving an event, the behavior execution engine 315 first goes through a list of entities of the current scene to find out on which one or more entities this received event has occurred. For instance, the behavior execution engine 315 parses the received event and identifies the location within the current scene where the user has touched. The behavior execution engine 315 finds one or more entities that are placed at the identified location in the current scene. In some embodiments, an entity has properties, which include dimensions, scale, location of the entity within a scene to which the entity belongs, etc. For each of the entities found, the behaviors execution engine 315 identifies one or more behaviors that are associated with the entity. Among these identified behaviors, the behaviors execution engine 315 then finds the behaviors that match the event. That is, the behaviors execution engine 315 finds those identified behaviors that include the received event. The behaviors execution engine 315 then identifies all responses that are associated with the event for each of the behaviors found.

For each of the identified responses of a behavior, the behaviors execution engine 315 notifies a response handler for the response. The behaviors execution engine 315 in some embodiments parameterizes the received event and sends the resulting parameters to the response handlers. In some embodiments, these parameters conform to the conformance protocol which the behaviors execution engine 315 and the response handlers use to communicate with each other. In some embodiments, the behaviors execution engine 315 receives parameters from response handlers. In some cases, the behaviors execution engine 315 translates this parameter format into an event format and finds behaviors that match the event. In other cases, the behaviors execution engine 315 passes the parameters to another response handler which executes the next response to be performed by the application 300.

The response handlers 335-345 execute responses. As described above, responses may be of different types. In some embodiments, each response handler can handle responses of different types. In other embodiments, each response handler is specific to a particular response and is able to handle only the particular response. A response handler in some embodiments translates the parameters received from the behaviors execution engine 315 into a format that the type of response that the handler is executing understands. For instance, a response handler for script responses translates parameters in the conformance protocol into values that a script response can understand. The response handler runs the script of the response, which takes the translated values as inputs.

In some embodiments, a response handler translates the result or output of the executed response into parameters in the conformance protocol. The response handler may pass the parameters back to the behaviors execution engine 315 or send the parameters to another response handler. The response handler that received the parameters then translates the parameters into inputs to the responses that this handler handles and then executes the responses. For instance, the response handler 335 handles responses of type A (e.g., an animation response). Parameters 365 that the response handler 335 receives do not include a next response to be executed. The response handler 335 translates the output of running the response 1 of type A into parameters 370 in the conformance protocol and sends them back to the behavior's execution engine 315. On the other hand, the parameters 375 includes a chain of responses to be executed in response to the received event. The response handler 340 translates the parameters 375 into inputs for response 2 of type B (e.g., a script response) and executes the response 2. The response handler 340 then translates the output of the response 2 into the parameters 380 in the conformance protocol. Since the response handler 340 knows the next response in the chain of responses to be executed, the response handler 340 sends the parameters 380 to the response handler 345 of type C.

Some embodiments execute responses in parallel in some cases. For instance, the response handler 335 and 340 may receive parameters 365 and 375 independently from the behavior execution engine 315 and execute the responses 1 and 2 in parallel. In other cases, some embodiments execute responses sequentially. For instance, as described above, the response handlers 340 and 345 execute the responses 2 and 3 sequentially when they receive the parameters 365 and 375, which are defined as being sequential in a chain of responses to be executed.

Figure 4:
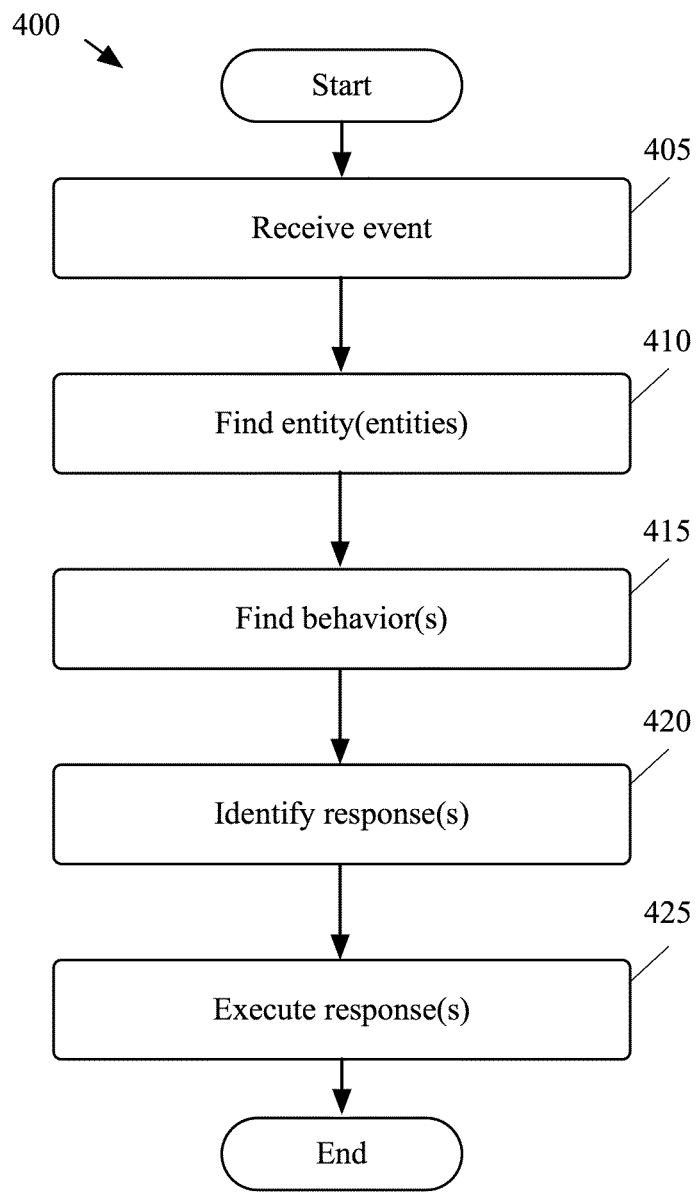
FIG. 4 conceptually illustrates a process performed by some embodiments to receive an event and execute responses associated with the event.

An example operation of the application 300 will now be described by reference to FIG. 4. FIG. 4 conceptually illustrates a process 400 performed by some embodiments to receive an event and execute responses associated with the event. In some embodiments, the application 300 performs the process 400. The process 400 begins by receiving (at 405) an event. For instance, the application 300 receives an event 310. The event 310 in this example indicates that the user has touched a graphical icon placed in a certain location of the current scene that is being displayed for the user.

Next, the process 400 finds (at 410) one or more entities to which the received event applies. The process uses information included in the event to identify the entities of the current scene to which the event applies. For instance, the application 300 goes through a list of entities of the current scene and finds out to which entities the event 310 has occurred. In this example, the application 300 identifies the graphical icon as the entity on which the event 310 has occurred.

The process 400 then finds (at 415) one or more behaviors that include the received event for each of the entities found at 410. The process in some embodiments first identifies all behaviors that are associated with an identified entity. As described above, entities of the application in some embodiments includes references to the behaviors that are associated with the entity. The process uses the references to identify all behaviors. The process then finds those identified behaviors that include the received event. In this manner, the process finds only the behaviors that are associated with an identified entity and that include the received event. In FIG. 3, the application 300 finds one behavior (not shown) that is associated with the graphical icon and that includes the event 310.

Next, the process identifies (at 420) all responses that are associated with the received event. The process identifies the responses from the behaviors found at 415. For instance, the application 300 identifies two responses, i.e., responses 2 and 3, that are associated with the one behavior that is associated with the graphical icon and includes the event 310.

The process then executes (at 425) all responses identified at 420. These responses include all responses that are associated with the received event in all behaviors. These behaviors are in turn associated with all entities to which the received event applies. The process in some embodiments may execute responses that are independent of each other in parallel. Also, the process may sequentially execute responses that are not independent of each other (e.g., chained responses).

In order to execute these identified responses, the process translates the received event into a format that a response type understands. For instance, the application 300 converts the event 310 into parameters in the conformance protocol and then translates the parameters to inputs to the response 2, which is of response type B. The application executes the response 2 using the inputs and then translates the output of the response 2 into the parameters 380 in the conformance protocol. The application 300 then translates the parameters 380 into inputs that the response 3 of response type 3 would understand. The application 300 then executes the response 3 with the inputs.

Figure 5:
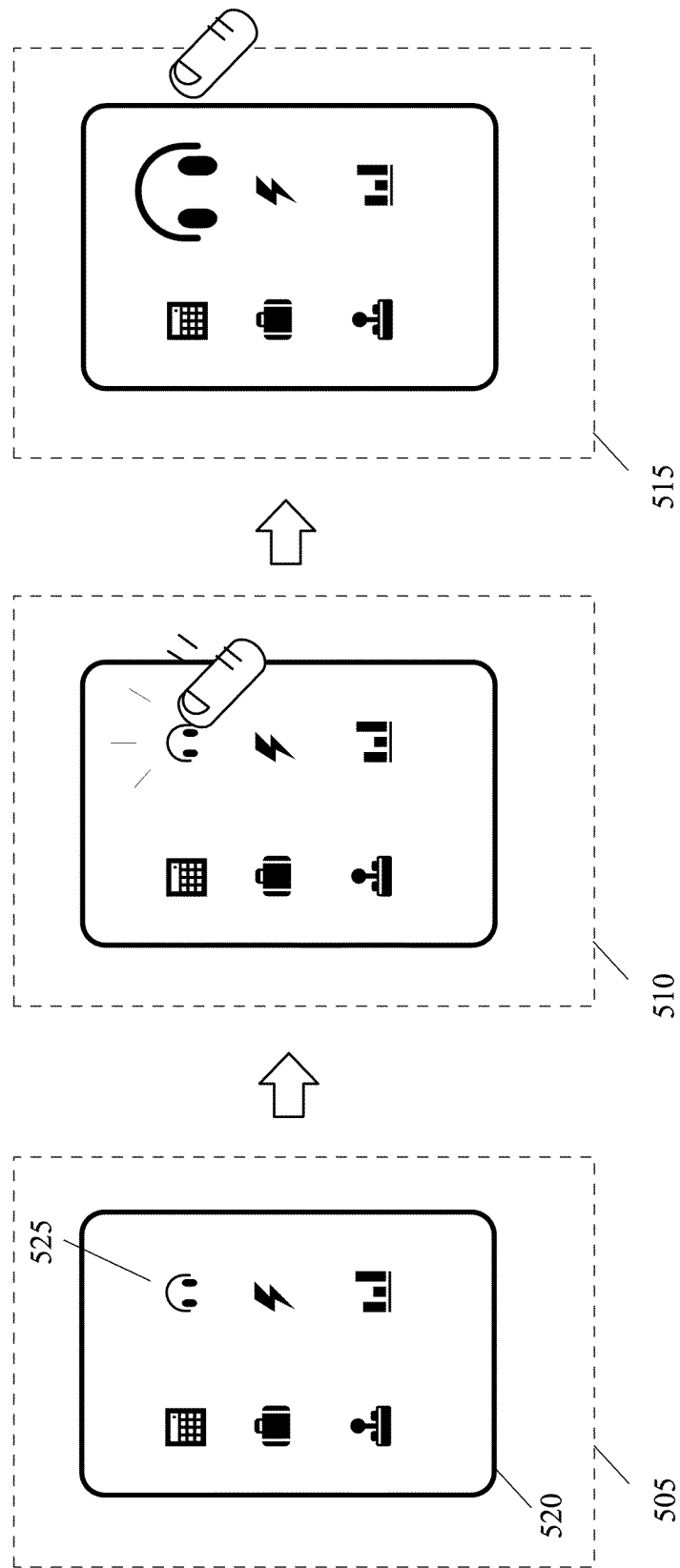
FIG. 5 illustrates a scene of an application that is running on a device with a display area.

FIG. 5 illustrates a scene of an application that is running on a device with a display area 520. Specifically, this figure illustrates in three different stages 505-515 that the application performs several responses in response to receiving several events. The application includes a scene that has six icons including an icon 525. The application includes behaviors 1 and 2 that are associated with the icon 525.

The behavior 1 is an association of one event and one animation response. The event in the behavior 1 is a touchdown, which represents user's placing her finger on the display area 520. The response in the behavior 1 is an animation response called "glow" which, when executed, makes the entity associated with the behavior 1 glow. The behavior 2 is also an association of one event and one animation response. The event in the behavior 2 is a touchup, which represents user's lifting her finger from the display area 520. The response in the behavior 2 is an animation response called "bulge" which, when executed, enlarges the entity associated with the behavior 2.

The first stage 505 shows the display area 520 displaying the icon 525 along with five other icons of the current scene. At the second stage 510, the user touches the icon 525 with a finger. Thus, the application has received a touchdown event. With the received event, which includes information about the location of the display area 520, the application identifies that the icon 525 is the entity on which the touchdown event has occurred. The application then finds out that the behaviors 1 and 2 are the only two behaviors that are associated with the icon 525. The application goes through these two behaviors' events and determines that only the behavior 1 has the matching event, a touchdown event. As a result, the application executes only the glow response of the behavior 1. As indicated in the stage 510, the icon 525 is glowing.

At the third stage 515, the user has lifted her finger. As the user lifts her finger up from the display area 520, the application receives the touchup event. The application again identifies that the icon 505 is the entity on which the touchup event has occurred. The application then finds out that the behaviors 1 and 2 are the two behaviors that are associated with the icon 525. The application goes through the two behaviors' events and determines that only the behavior 2 has the matching event, a touchup event. The application thus executes only the bulge response of the behavior 2. As shown at the third stage 515, the icon 515 is enlarged as the finger is lifted up from the display area 520.

Figure 6:
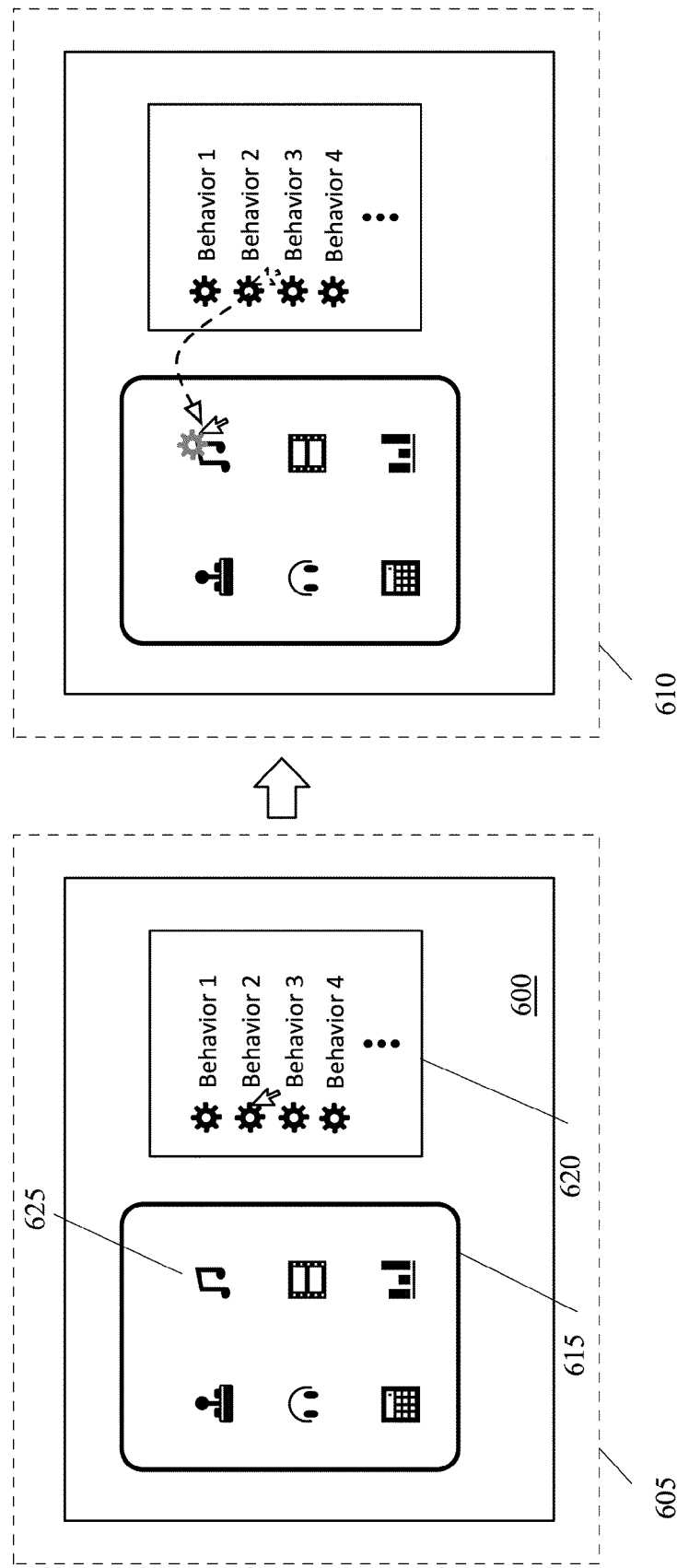
FIG. 6 conceptually illustrates a GUI of an authoring platform, which allows a user to graphically associate a behavior with an entity of a scene of an application being built.

FIG. 6 conceptually illustrates a graphical user interface (GUI) 600 of an authoring platform, which allows a user to graphically associate a behavior with an entity of a scene of an application being built. Specifically, this figures illustrates in two different stages 605 and 610 that behavior 2 is getting associated with an icon 625. As shown, the GUI 600 includes a scene preview area 615 and a behaviors library 620.

The scene preview area 615 displays a scene of the application being built. The user can create or modify the scene by adding or deleting entities (e.g., a graphical icon) to and from the scene preview area 615. In some embodiments, the scene preview area 615 also allows the user to simulate running the scene of the application. That is, the user can playback the scene in the scene preview area 615.

The behaviors library 620 displays a list of behaviors that are represented as graphical objects. These behaviors can be associated with entities displayed in the scene preview area 615. In some embodiments, the behaviors library 620 displays predefined behaviors. The behaviors library 620 also allows the user of the authoring platform to add new behaviors. In some embodiments, the GUI 600 allows the user of the authoring platform to associate an entity and a behavior by dragging a graphical object representing the behavior and dropping it onto an entity displayed in the scene preview area 615.

At the first stage 605, the user of the authoring platform selects behavior 2. The user can select a behavior displayed in the behaviors library. This selection may involve clicking a mouse button or tapping a touchscreen to select a graphical object representing a behavior, selecting an option through keyboard input, etc.

At the second stage 610, the user of the authoring platform drags behavior 2 over the icon 625. In some embodiments, as the user moves the cursor while a behavior is selected, the GUI shows the graphical object (e.g., a gear-looking icon) along the path of the cursor in order to provide a visual cue. When the graphical object hovers near an icon, the GUI may provide another visual cue (e.g., a different background color for the icon) to indicate that the behavior represented by the graphical object will be associated with the icon once the graphical object is dropped there. The user drops the graphical object representing the behavior 2 onto the icon 625. As a result, the icon 625 is associated with the behavior 2. That is, when an authored application that includes this scene is executed, the application will run the response defined in the behavior 2 upon receiving an event that is associated with the response in the behavior 2 and the icon 625.

Figure 7:
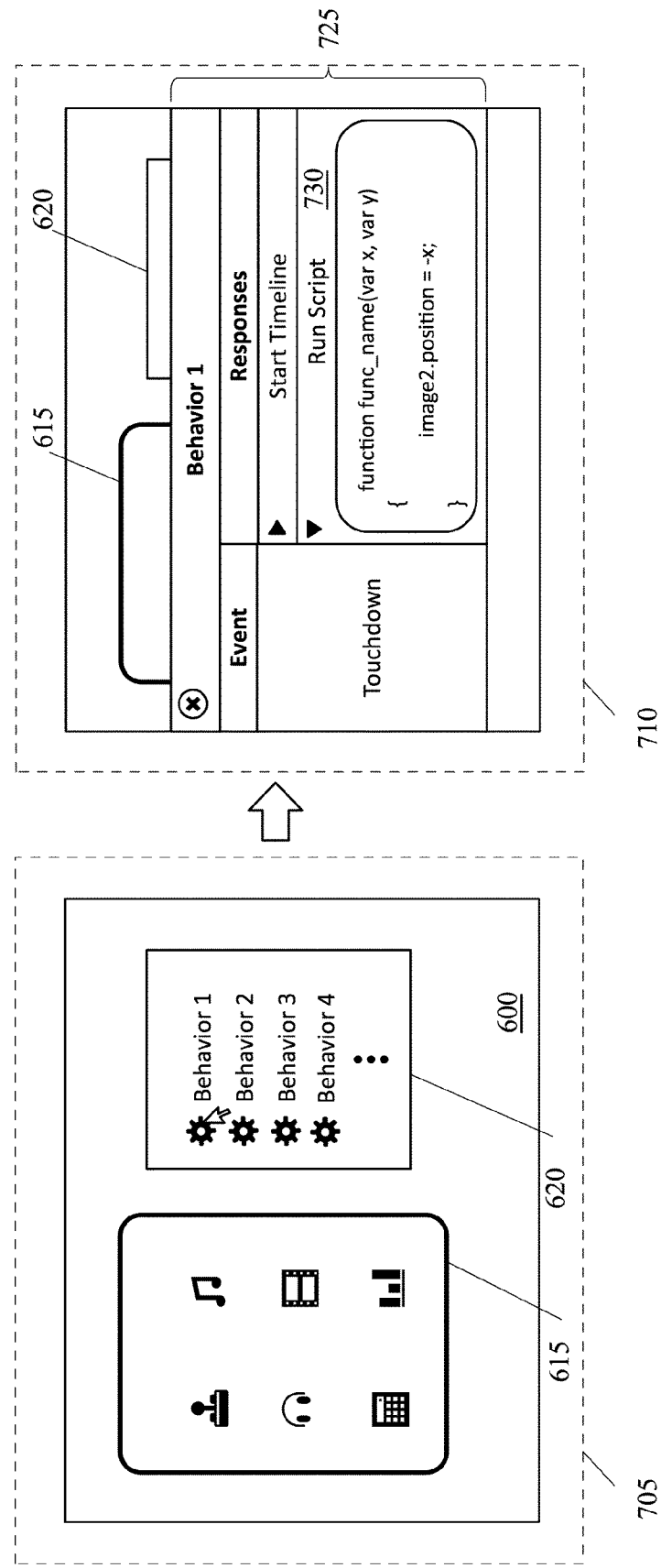
FIG. 7 conceptually illustrates a GUI of an authoring platform, which allows a user to create and modify behaviors for an application being built.

FIG. 7 conceptually illustrates the GUI 600 of the authoring platform, which allows a user to create and modify behaviors for an application being built. Specifically, this figure illustrates in two different stages 705 and 710 launching a behavior editor 725.

At the first stage 705, the user of the authoring platform selects behavior 1 to launch a behavior editor. The GUI 600 in some embodiments displays a behavior editor when the user selects a behavior displayed in the behaviors library 620. This selection may involve clicking a mouse button or tapping a touchscreen to select a graphical object representing a behavior, selecting an option through keyboard input, etc. For instance, the user may double-click on a graphical object representing a behavior to launch a behavior editor.

At the second stage 710, the GUI 600 displays the behavior editor 725. As shown, the behavior editor 725 in some embodiments includes two columns for showing events and responses. The events column lists one or more events that are defined in the behavior being edited. The responses column lists responses associated with events listed in the events column. In some embodiments, each response in the response column is displayed in an expandable row. For instance, a response row for the script response 730 is expanded to include the script editing area in which the user can modify or create scripts. In some embodiments, the behavior editor occupies a portion or the entirety of the GUI 600. In other embodiments, the behavior editor may be a separate window that can be separately manipulated from the GUI 600.

Figure 8:
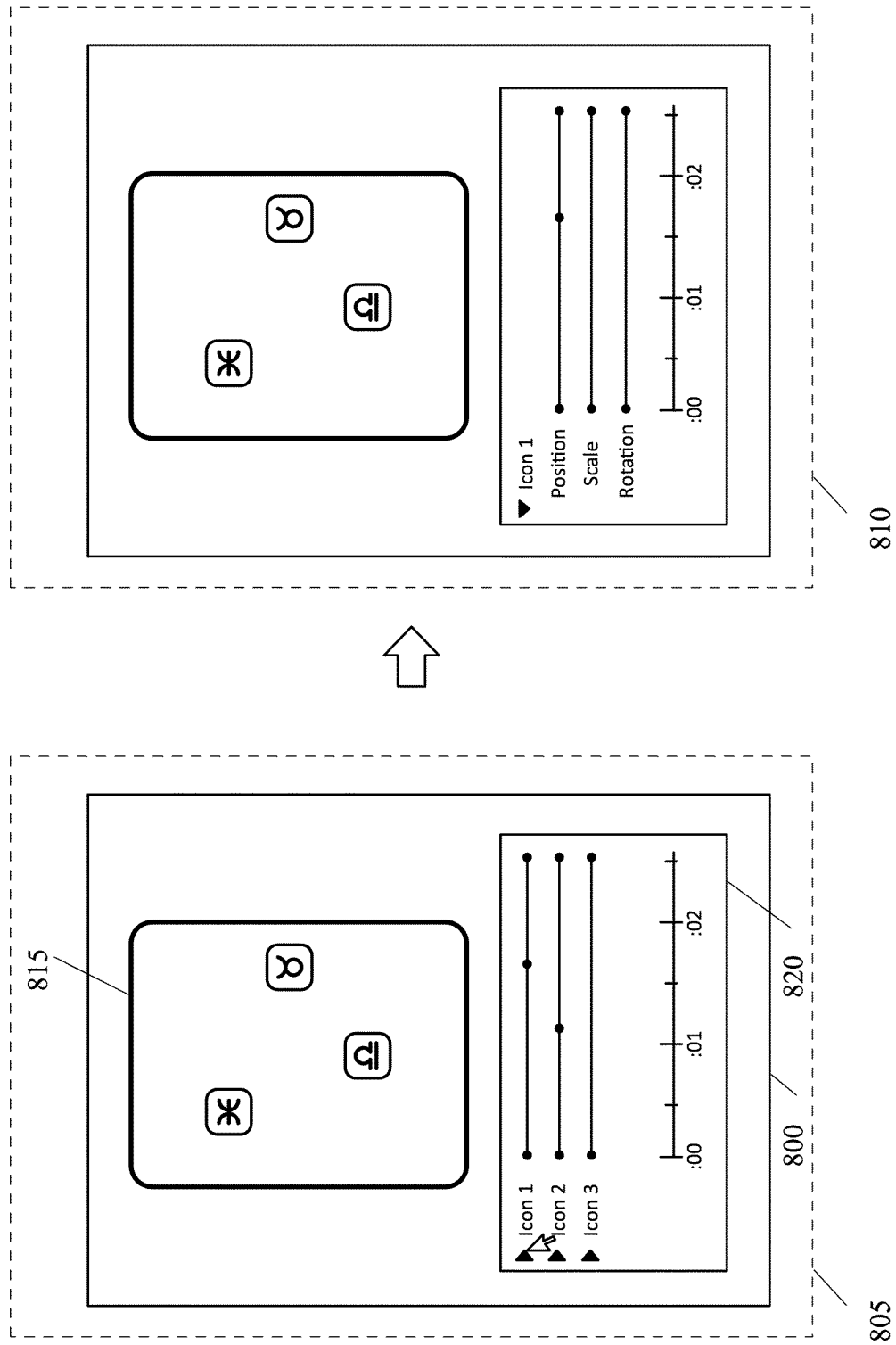
FIG. 8 conceptually illustrates a GUI of an authoring platform.

FIG. 8 conceptually illustrates a GUI 800 of an authoring platform. Specifically, this figure illustrates in two different stages 805 and 810 that a key-indexed graph for an entity of a scene can be expanded to sub-key-indexed graphs for the properties of the entity. As shown, the GUI 800 includes a scene preview area 815 and the key indices display area 820.

The scene preview area 815 is similar to the scene preview area 615 described above by reference to FIG. 6. The key indices display area 820 displays a key-indexed graph for each of the entities that belong to a scene that is being edited in the authoring platform. In some embodiments, the GUI 800 allows the user of the authoring platform to place handles for key indices (e.g., keyframes) on the key-indexed graph. A key index pair represents a start or an end of an animation for an entity (e.g., an icon) of a scene. For instance, the first key index of a key index pair defines a first location of the entity within the scene at the beginning of a time period and the second key index of the key index pair may define a second location of the entity within the scene at the end of the time period. When the scene is played back for the time period represented by the two key indices of the pair, the entity moves from the first location at the beginning of the time period to the second location at the end of the time period. In some embodiments, the intermediate positions of the icon being moved during the time period are interpolated based on the first and the second positions. Thus, an animation may be defined as a set of key indices placed along a key-indexed graph. In this manner, key indices in some embodiments are used like the way keyframes are used for a video file (e.g., for defining the starting and ending points of any smooth transition.)

At the first stage 805, the scene preview area 815 displays three icons of a scene that is being edited. The key indices display area 820 displays three key-indexed graphs of the three icons 1-3. The key-indexed graphs for the icons 1 and 2 each have a key index depicted as a black dot in the figure. The hollow dots at the end of key-indexed graphs represent the end of key-indexed graph for the three icons. In some embodiments, the user selects the key-indexed graph for the icon 1 to expand this key-indexed graph into sub-key-indexed graphs. This selection may involve clicking a mouse button or tapping a touchscreen to select the key-indexed graph, selecting an option through keyboard input, etc. For instance, the user may click on the black triangle to cause the key indices display area 820 to display sub-key-indexed graphs for the properties of the icon 1. The properties of an entity in some embodiments include a position, a scale, a rotation, a color, etc. to name a few.

At the second stage 810, the GUI has expanded the key-indexed graph for the icon 1 into sub-key-indexed graphs for some of the properties of the icon 1. Not all of sub-key-indexed graphs for all the properties are depicted in this figure for simplicity of description. By providing a sub-key-indexed graph for each of the properties of an entity, the GUI 800 allows the user to control each property of the entity by adding and editing key indices to the sub-key-indexed graph. For instance, the user can have the color of an entity to change gradually by introducing a key index in the sub-key-indexed graph for the color property of the entity.

Figure 9:
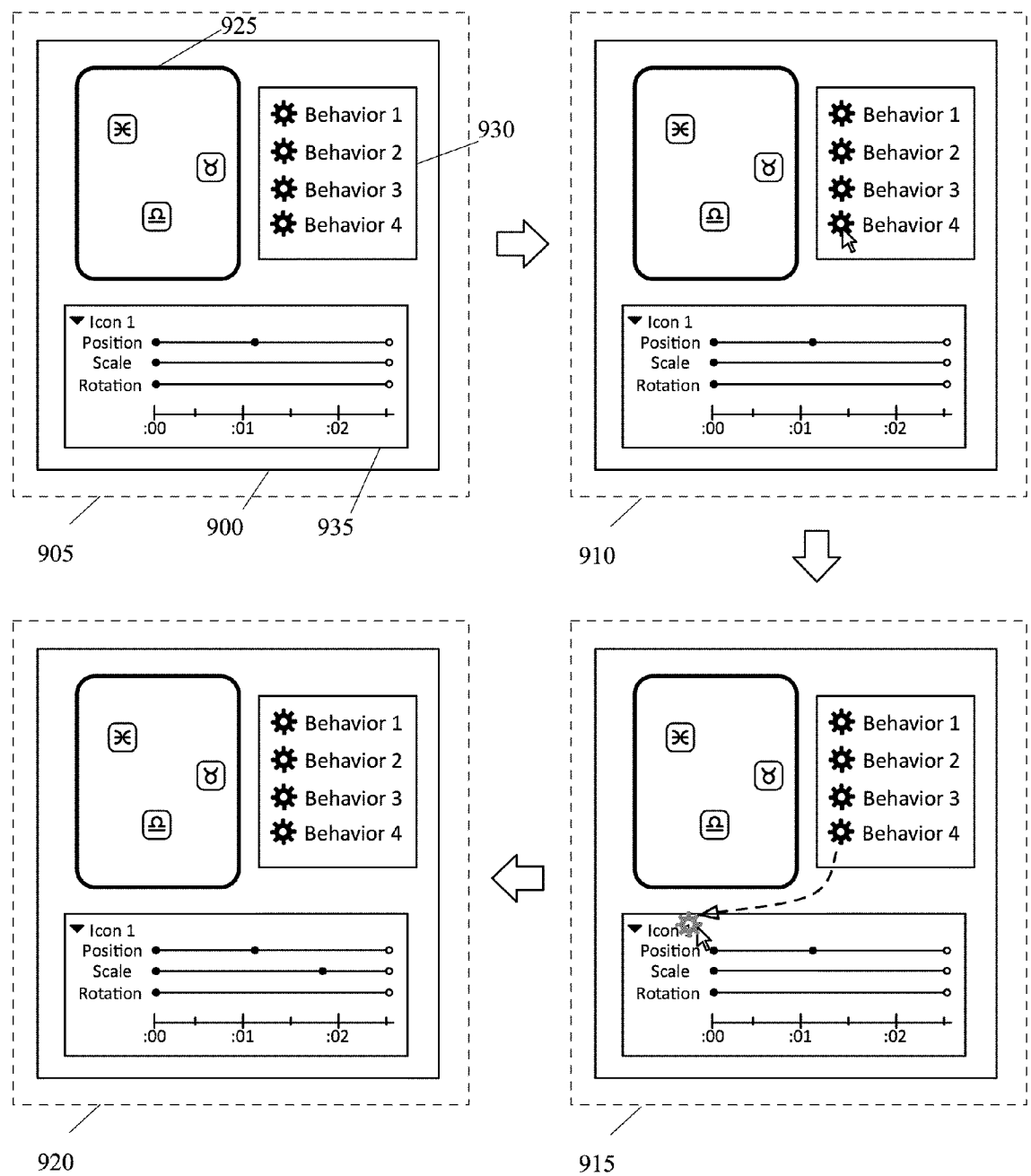
FIG. 9 conceptually illustrates a GUI of an authoring platform of some embodiments.

FIG. 9 conceptually illustrates a GUI 900 of an authoring platform of some embodiments. Specifically, this figure illustrates in four different stages 905-920 that two behaviors including animation responses can be combined in the key-indexed graphs. As shown, the GUI 900 includes a scene preview area 925, a behaviors library 930, and a key indices display area 935. The scene preview area 925 is similar to the scene preview area 615 described above by reference to FIG. 6. The behaviors library 930 is similar to the behaviors library 620 described above by reference to FIG. 6. The key indices display area 935 is similar to the key indices display area 820 described above by reference to FIG. 8.

The authoring platform of some embodiments allows for combining two animation responses in the key-indexed graphs when the responses are associated with the same event. As described above, an animation response may be represented as a set of key indices for one or more entities of a scene. Combining several animation responses in the key-indexed graphs therefore means combining the key indices of different responses in some embodiments. The GUI 800 allows the user to combine responses in the key-indexed graphs by dragging a behavior from the behaviors library and dropping the behavior on the key indices display area near the key-indexed graphs of another response of another behavior.

When the response that is being dropped does not have the same triggering event as the response that is being shown in the key indices display area, the GUI 900 may prompt a message indicating that the response that is being dropped may not be combined. Many other combinations of key indices may occur and different embodiments treat these combinations differently. For instance, when a first key index of a first response overlaps with an existing second key index of a second response, the authoring platform of different embodiments may (1) keep the second key index only, (2) keep the first key index only, or (3) composite the first and the second key indices (e.g., by taking a mean of the values represented by the two key indices). When different key indices of different responses fall in the same key-indexed graph, the authoring platform of different embodiments may (1) keep the existing key indices only, (2) keep the key indices of the response being dropped, or (3) keep all of the key indices.

At the first stage 905, the key indices display area 935 is displaying sub-key-indexed graphs for the properties of the icon 1. Particularly, the sub-key-indexed graphs are showing an animation response of a behavior that is associated with the icon 1. The icon 1 is associated with behavior 1, which includes an animation response. This animation response adjusts the position property of the entity with which the behavior 1 is associated. As shown, the sub-key-indexed graph for the position property of the icon 1 has a key index around the middle of the time period that the animation response spans. When the scene receives an event that is associated with this animation response of behavior 1, the icon 1 will move to the position specified by the key index in response to receiving the event.

At the second stage 910, the user of the authoring platform selects behavior 4. This selection may involve clicking a mouse button or tapping a touchscreen to select a graphical object representing a behavior, selecting an option through keyboard input, etc. The behavior 4 includes the same event as the event that the response of behavior 1 is associated with. The behavior 4 also has an animation response that is associated with that event. This animation response adjusts the scale property of the entity with which the behavior 4 is associated.

At the third stage 915, the user drags behavior 4 and drops onto the key indices display area 935 which is currently showing the animation response of the behavior 1. The fourth stage 920 shows that a key index has appeared on the sub-key-indexed graph for the scale property of the icon 1 as a result of dropping behavior 4 onto the key indices display area 935.

FIG. 9 illustrates merging responses in the key-indexed graphs by dropping behaviors onto the key indices display area near sub-key-indexed graphs for a particular entity. However, the key indices display area does not have to be showing sub-key-indexed graphs for merging to happen. Also, the authoring platform of some embodiment allows for merging responses in different ways instead of or in conjunction with dropping behavior onto the key indices display area. For instance, the authoring platform of some embodiments allows the user to merge responses by dropping behaviors onto an entity displayed in the scene preview area.

Several detailed embodiments of the invention are described in the sections below. Section I describes the conformance protocol and architecture of an authored application of some embodiments. Section II describes GUI tools of the authoring platform of some embodiments, including a behavior editor. Section III describes merging responses in the key indices display area of some embodiments. Section IV then describes automatic detection of boundaries of transparent area within an image. Next, Section V describes architecture of the authoring platform of some embodiments. Finally, Section VI describes an electronic system that implements some embodiments of the invention.

I. Conformance Protocol

A. Data Relationship

The application authored by the authoring platform of some embodiments includes one or more scenes. As described above, a scene includes one or more entities, which are graphical objects with which a user of the application can interact. A scene has spatial properties as well as temporal properties. That is, a scene has a border in which to hold the entities and has duration for displaying the scene. The application displays a scene on a display device for a machine on which the application is running. The application processes the user's interactions with the entities of the scene, which may involve displaying another scene that the application includes.

Figure 10:
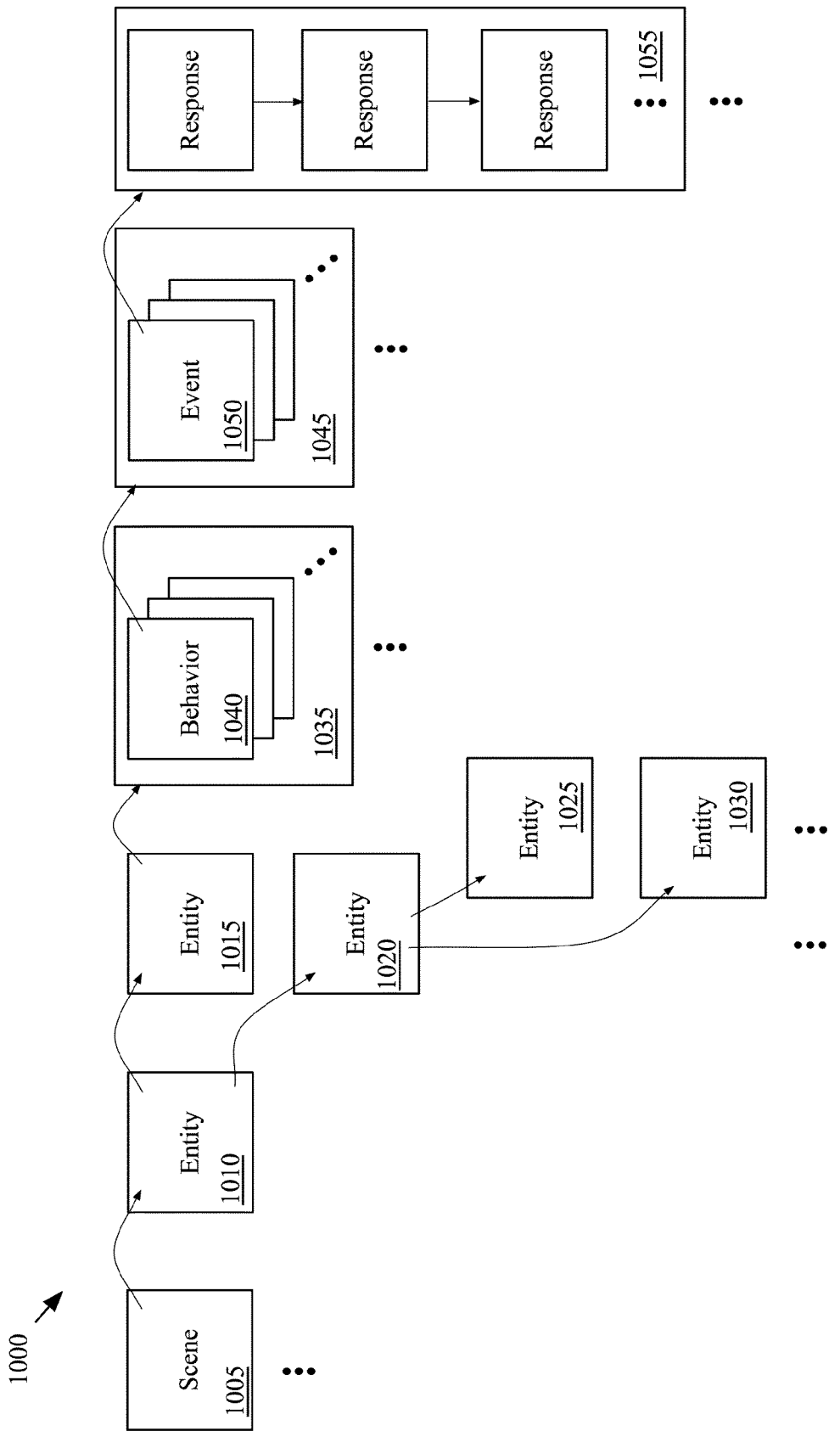
FIG. 10 conceptually illustrates relationship between different instances of data of an application, which is built by an authoring platform of some embodiments.

FIG. 10 conceptually illustrates relationship between different instances of data of an application 1000, which is built by an authoring platform of some embodiments. Specifically, this figure illustrates that the entities that the application includes are associated with behaviors. The application therefore runs responses when the application receives events that are associated with the responses.

FIG. 10 illustrates a scene 1005 that the application has. Other scenes that the application includes are not depicted for simplicity of description. The scene 1005 includes entities 610-625. An entity also has spatial properties and temporal properties. Spatial properties of an entity include a scale, rotation, color, position, opacity, three dimensional coordinates, etc. Temporal properties of an entity include duration for displaying the entity.

Entities of a scene in some embodiments form a hierarchy such as a tree-like structure. As shown, the scene 1005 has a root entity 1010, which has two sub-entities 1015 and 1020. The entity 1020 has two sub-entities 1025 and 1030. An entity in some embodiments appears behind (or, is a layer behind) its sub-entities when the scene is displayed. In some cases, an entity may spatially enclose its sub-entities. The entities 1015 and 1020 are peers. So are the entities 1025 and 1030. Peer entities in some embodiments are entities that are not spatially enclosed by each other. The entities in some embodiments dynamically form a hierarchy. That is, the hierarchy may be changed as the entities may appear or disappear from the scene while the application is running.

As described above, an entity of a scene can be associated with one or more behaviors. The association of behaviors and events are made during the application was being built by an authoring platform of some embodiments. Each behavior includes or is associated with an event. As described above, a behavior in some embodiments is a data structure that has references to events and responses that are associated with the events. Each event of a behavior is associated with one or more responses. As shown, the entity 1015 is associated with behaviors 1035. A behavior 1040 is associated with events 1045. An event 1050 is associated with responses 1055. The responses 1055 conceptually form a chain to indicate that the responses 1055 are performed in series when the event 1050 occurs on the entity 1015. Moreover, as described above, when an event of a behavior is associated with responses that are independent of each other (e.g., not in a chain), these responses are performed in parallel when such event occurs.

B. Authored Application Architecture

Figure 11:
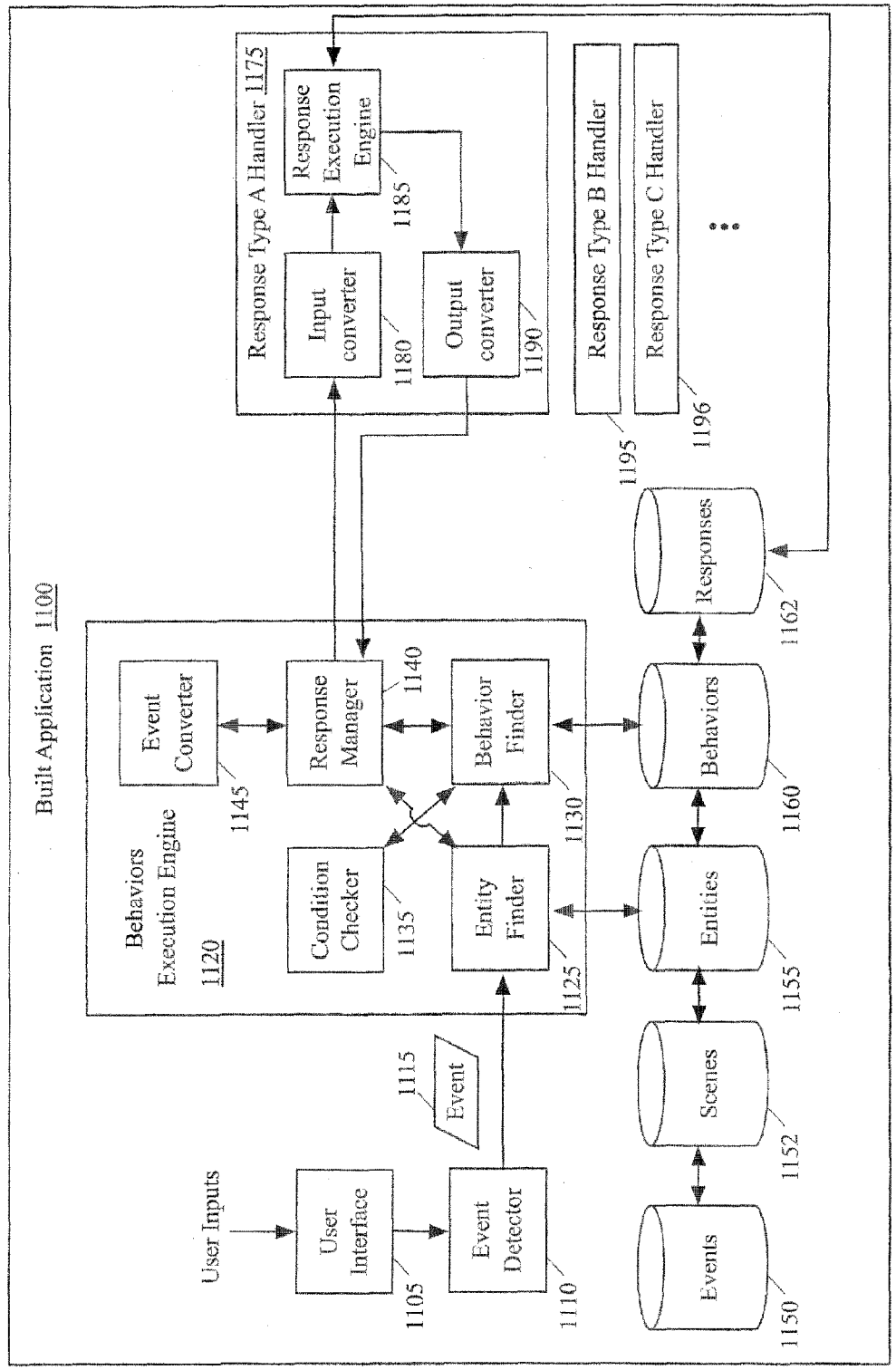
FIG. 11 illustrates example architecture of an application built by an authoring platform of some embodiments.

FIG. 11 illustrates example architecture of an application 1100 built by an authoring platform of some embodiments. Specifically, this figure illustrates that the application 1100 performs several responses of different types in response to receiving an event from a user of the application. As shown, the built application 1100 includes a user interface 1105, an event detector 1110, a behavior execution engine 1120, an events repository 1150, a scenes repository 1152, an entities repository 1155, a behaviors repository 1160, and a responses repository 1162. The application 1100 also includes response handlers 1175, 1195, and 1196.

The user interface 1105 receives user inputs. Specifically, the user interface in some embodiments encapsulates the user's interaction with the application 1100. For instance, when user touches a certain part of a display device that displays a scene of the application, the user interface 1105 detects the touch and generates data indicating the touch. In some embodiments, the user interface 1105 does not detect and translate the user's interactions. Instead, the user interface 1105 receives encapsulation of user's interaction from the operating system of the device on which the application 1100 is being executed. The user interface 1105 sends the encapsulation of the user's interaction to the event detector 1110.

The event detector 1110 receives the encapsulation of the user interaction from the user interface 1105 and translates it into an event format that the behavior execution engine 1120 can understand. The event detector 1110 receives other data from other components (not shown) of the application 1100 and determines whether these data can constitute an event. For instance, when an entity disappears from the current scene being displayed, the event detector 1110 detects the disappearance as form of data and determines whether this disappearance should be translated into an event to send to the behavior's execution engine 1120. In some embodiments, the event detector 1110 looks up the event definitions stored in the events repository 1150 in order to make such determination.

The events repository 1150 stores event definitions of possible events that may occur for the scenes of the applications. The scenes repository 1152 and the entities repository 1155 are similar to the scenes repository 320 and the entities repository 325, respectively, described above by reference to FIG. 3. The behaviors repository 1160 is similar to the behaviors repository 330 described above by reference to FIG. 3 except that the behaviors stored in the behaviors repository 1160 includes references to events and responses stored in the events repository 1150 and the responses repository 1162. The behaviors repository 1160 stores all behaviors (i.e., associations of events and responses) that are associated with entities of the application. The repositories 1150, 1152, 1155, 1160, and 1162 each may be a cache or other persistent storage medium in some embodiments.

The behaviors execution engine 1120 is similar to the behaviors execution engine 315 described above by reference to FIG. 3. In addition, the behaviors execution engine 1120 includes an entity finder 1125, a behavior finder 1130, a conditions checker 1135, a response manager 1140, and an event converter 1145.

The entity finder 1125 receives an event from the event detector 1110 and finds one or more entities on which the event has occurred. The entity finder 1125 in some embodiments uses the coordinates of the event in the current scene to find the entities on which the event occurred. The entity finder 1125 may also walk through entity hierarchy (e.g., by using a breadth-first or a depth-first search) formed by the entities. An example entity hierarchy was described above by reference to FIG. 10.

The behavior finder 1130 receives a list of entities on which the event has occurred. For each of the entities in the list, the behavior finder 1130 identifies all behaviors that are associated with the entity. Then the behavior finder 1130 examines each identified behavior to see which behavior refers to (or includes) an event that matches the received event. When the matching event of a behavior has additional conditions to meet in order to trigger responses that are associated with the event, the behavior finder 1130 uses the condition checker 1135 to determine whether these conditions are met. As described above, the authoring platform of some embodiments allows a user of the platform to define these additional conditions to meet. An example condition may be whether the entity has a certain name. More details about defining and adding conditions to the event will be described further below.

When all conditions (if any) are met, the finder adds this behavior to a list of behaviors from which to identify responses to execute. This list of behaviors then includes the behaviors that have an event that matches the received event and have all of the conditions (if any) met. For each of the behaviors in the behaviors list, the behavior finder 1130 identifies all responses that are associated with the matching event of the behavior. The behavior finder 1130 then sends the identified responses to the response manager 1140.

The response manager 1140 converts the received event into parameters that conform to a protocol (or a format) using the event converter 1145. As mentioned above, this protocol is referred to as the conformance protocol. The parameters formatted in the conformance protocol are understood by the behavior execution engine 1120 and different types of response handlers. In other words, this conformance protocol enables different types of responses to communicate with each other.

The response manager 1140 sends the parameters converted from the received event to a response handler for each of the responses identified by the behavior finder 1130. The response manager 1140 also sends additional parameters in the conformance protocol. The additional parameters include a parameter identifying the response to be executed by the response handler. When the received event is associated with a chain of responses for a behavior, the response manager 1140 sends all these parameters (i.e., parameters converted from the received event and additional parameters) to the response hander for the first response of the chain.

The response handlers 1175, 1195, and 1196 are similar to the response handlers 335-345, respectively, described above by reference to FIG. 3. In addition, the response handler 1175 includes an input converter 1180, a response execution engine 1185, and an output converter 1190. The input converter 1180 converts the parameters received from the response manager 1140 into a format that a type of response can understand. For instance, when the response handler 1175 handles a script response, the input converter 1180 translates the received parameters in the conformance protocol into values that the script response can understand. The response execution engine 1185 identifies a response to execute based on the received parameters and then executes the response with the inputs converted from the received parameters.

The response execution engine 1185 in some embodiments retrieves response definitions (e.g., script) from the responses repository 1162. The response execution engine 1185 then sends the output of the executed response to the output converter 1190 in some embodiments. In other embodiments, the response execution engine 1185 does not send anything to the output converter 1190. That is, these embodiments do not include or use the output converter 1190.

The output converter 1190 converts the output into parameters in the conformance protocol. The output converter 1190 in some embodiments sends the parameters to the response manager 1140. In some cases, the output converter 1190 sends the parameters to a response handler for a response that is next in the chain of responses triggered by the received event. When the next response in the chain is of the same type as the response just executed, the response handler 1175 in some embodiments may bypass the conversion of the output into the conformance protocol parameters and use the output of the executed response as inputs to the next response in the chain.

When the response manager 1140 receives parameters from a response handler, the response manager 1140 determines whether there is another response in a chain of responses that needs to be executed. When such response exists, the response manager 1140 relays the received parameters along with additional parameters to the response handler for that next response. When such response does not exist (i.e., when the previously executed response is the last response in the chain or is not part of a chain of responses), the response manager 1140 in some embodiments converts the parameters to an event format using the event converter 1145. The response manager 1140 of these embodiments then sends the event to the entity finder 1125 so that the entity finder 1125 can determine whether this event triggers any other responses.

Figure 12:
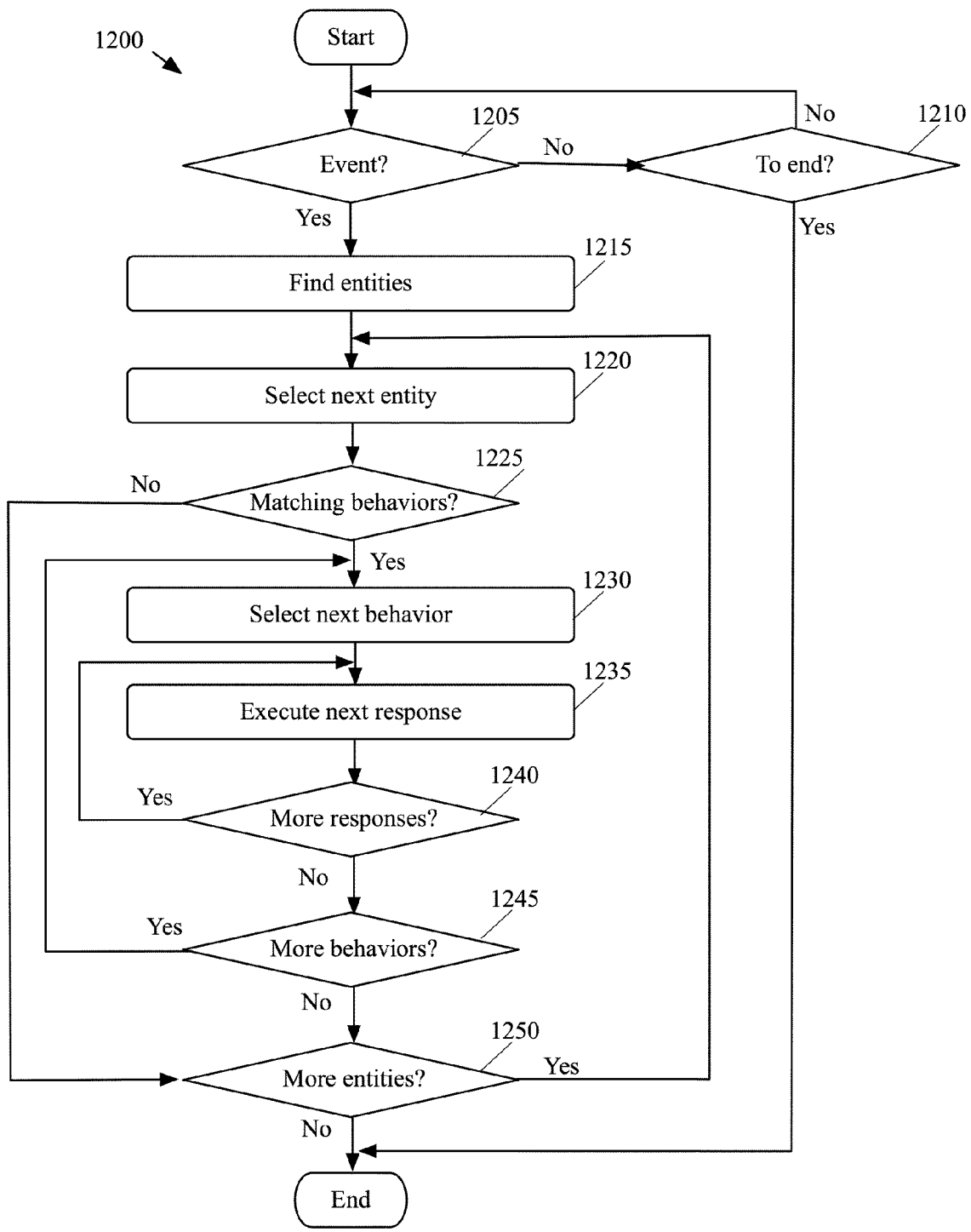
FIG. 12 conceptually illustrates a process performed by some embodiments to receive an event and execute responses associated with the event.

An example operation of the application 1100 will be described now by reference to FIG. 12. FIG. 12 conceptually illustrates a process 1200 performed by some embodiments to receive an event and execute responses associated with the event. The process 1200 may be performed by an application such as the application 1100 that is built by an authoring platform of some embodiments. The process 1200 starts as the application starts playing back a scene.

The process 1200 begins by determining (at 1205) whether an event has occurred. In some cases, the process 1200 detects an event when the user interacts with one or more entities of the scene by touching or clicking the entities of the scene. In other cases, the process 1200 detects an event when one or more entities of the scene change. Such changes may include appearance or disappearance of an entity of a scene. As described above, some such changes may not constitute an event. The process determines whether the changes could make an event by going through the event definitions. For instance, the application 1100 looks up the event definitions stored in the events repository 1150 in order to make such determination. The application 1100 detects an event 1115, which is a touchdown event.

When the process determines (at 1205) that no event has occurred, the process 1200 then determines whether to end 1210. The process 1200 ends when the application plays another scene or when the application is closing down. If at 1210 the process determines that it should end, the process ends. Otherwise, the process 1200 loops back to 1205 to determine whether an event has occurred.

When the process determines (at 1205) that an event has occurred, the process identifies (at 1215) the entities of the scene on which the event has occurred. The process in some embodiments uses the location where the event has occurred to identify such entities. For instance, the application 1100 goes through an entity hierarchy to identify all entities that overlaps the location of the touchdown event 1115. The application 1100 identifies an image as the entity on the touchdown event. That is, the user of the application 1100 is touching the image displayed.

Next at 1220, the process 1200 selects an entity that is identified at 1215 and identifies all behaviors that are associated with the selected entity. The process then determines (at 1225) whether any of the identified behaviors matches the event that has occurred on the selected entity. That is, the process determines whether each of the identified behaviors has an event that matches the event that has occurred on the selected entity. The process examines each identified behavior to see the behavior refers to (or includes) an event that matches the event occurred. For example, the process 1200 selects an image on which a touchdown event occurred. The process 1200 identifies two behaviors that are associated with the image. Each of these two behaviors includes a touchdown event. In the first behavior, the touchdown event is associated with an animation response, which, when executed, will enlarge the image by 200 percent. In the second behavior, the touchdown event is associated with another animation response, which, when executed, makes the image glow. Accordingly, the process 1200 determines that these two behaviors have an event that matches the event occurred.

In some embodiments, the process 1200 also checks for the conditions that might be augmented to the matching event. The conditions checking process will be described in detail further below by reference to FIG. 13.

When the process 1200 determines (at 1225) that none of the behaviors has a matching event or satisfies all the conditions (if any). When none of the behaviors has a matching event or satisfies all the conditions, the process then proceeds to 1250, which will be described further below.

When the process 1200 determines (at 1225) that there are one or more behaviors that have a matching event and have all of the conditions (if any) met, the process selects (at 1230) one of the behaviors and identifies all responses that are associated with the matching event. At 1235, process 1200 then selects and executes a next response. In some cases, this next response is the first of a series of responses that is associated with the matching event of the selected behavior. In the example, the process 1200 selects the first behavior of the two behaviors identified. Then, the application 1100 executes the animation response, causing the image to enlarge by 200%.

Next, the process 1200 determines (at 1240) whether there are more responses that are associated with the matching event of the selected behavior that have not been executed. When the process 1200 determines (at 1240) that there are more such responses, the process 1200 loops back to 1235 to select and execute the next response. Otherwise, the process 1200 proceeds to 1245 to determine whether there are more identified behaviors that have not been processed yet. In the example, the process 1200 selects the second behavior of the two behaviors identified. The process 1200 then executes the animation response to cause the image to glow. In some embodiments, the process 1200 may execute the animation responses of the first and the second behaviors in parallel rather than sequentially because the two animation responses are not in the same chain of responses of one behavior.

When the process determines (at 1245) that there are more identified behaviors that have not been processed yet, the process 1200 loops back to 1230 to select another identified behavior and identify all responses that are associated with the matching event of this behavior. Otherwise, the process proceeds to 1255 to determine whether there are more identified entities remain to be processed. When the process 1200 determines (at 1250) that there are more identified entities to process, the process 1200 loops back to 1220 to select another identified entity. Otherwise, the process 1200 ends.

Figure 13:
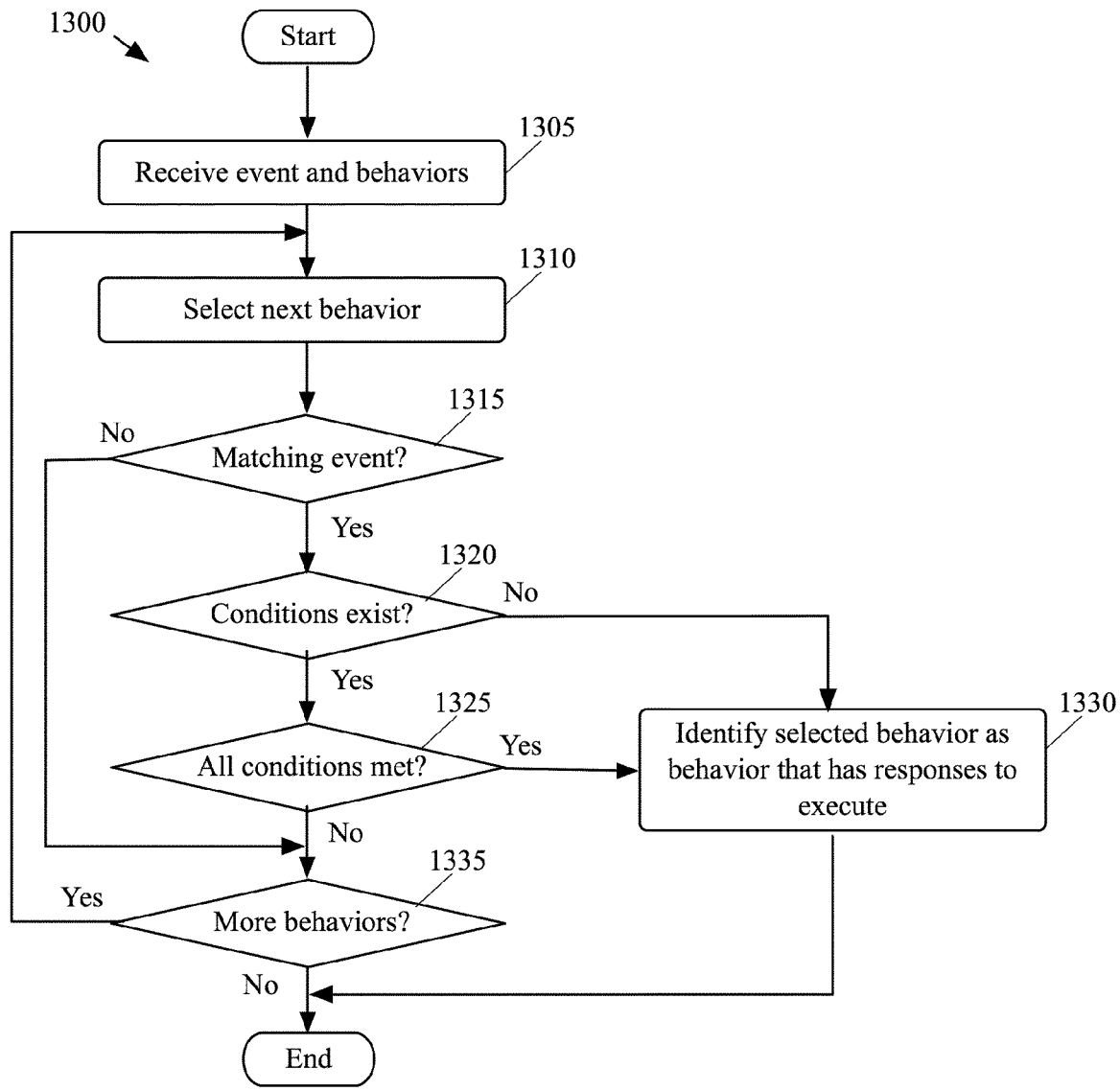
FIG. 13 conceptually illustrates a process that some embodiments perform to identify behaviors that have matching event and have all conditions (if any) met.

FIG. 13 conceptually illustrates a process 1300 that some embodiments perform to identify behaviors that have matching event and have all conditions (if any) met. The process 1300 may be performed by an application that is built by the authoring platform of some embodiments. The process begins by receiving (at 1305) an event that has occurred on an entity of a scene and one or more behaviors that are associated with the entity.

Next, the process 1300 selects (at 1310) a next behavior from the behaviors received at 1305. The process 1300 then determines (at 1315) whether the selected behavior has an event that matches the received event. In some embodiments, the process 1300 compares the event data defined in the behavior and the received event data. When the process 1300 determines (at 1315) that the selected behavior does not have a matching event, the process 1300 proceeds to 1335, which will be described further below.

When the process 1300 determines (at 1315) that the selected behavior has a matching event, the process 1300 then determines (at 1320) whether the matching event has conditions to meet to trigger responses that are associated with the matching event. When the process 1300 determines (at 1320) that the matching event does not have any conditions to meet, the process 1300 proceeds to 1330 to identify the selected behavior as a behavior of which to execute responses. Otherwise, the process 1300 proceeds to 1325 to determine whether all conditions are met. The process 1300 checks each condition. An example condition may be whether the entity has a certain color value. The process determines that this condition is met when the entity has that color value.

When the process 1300 determines (at 1325) that all conditions are met, the process 1300 proceeds to 1330 and identifies the selected behavior as a behavior, of which to execute responses. When the process 1300 determines (at 1325) that not all conditions are met, the process 1300 determines (at 1335) whether there are more received behaviors left to process. When the process 1300 determines (at 1335) that there are more such behaviors left, the process loops back to 1310 to select the next received behavior. Otherwise, the process ends.

Having described the relationship between instances of scenes, entities, behaviors, events, and responses that an authored application uses at runtime and the operations of the authored application at runtime, the next Section II will now describe several tools for defining scenes, entities, behaviors, events, and responses.

II. GUI Tools of Authoring Platform

A. Behavior Editor

Figure 14:
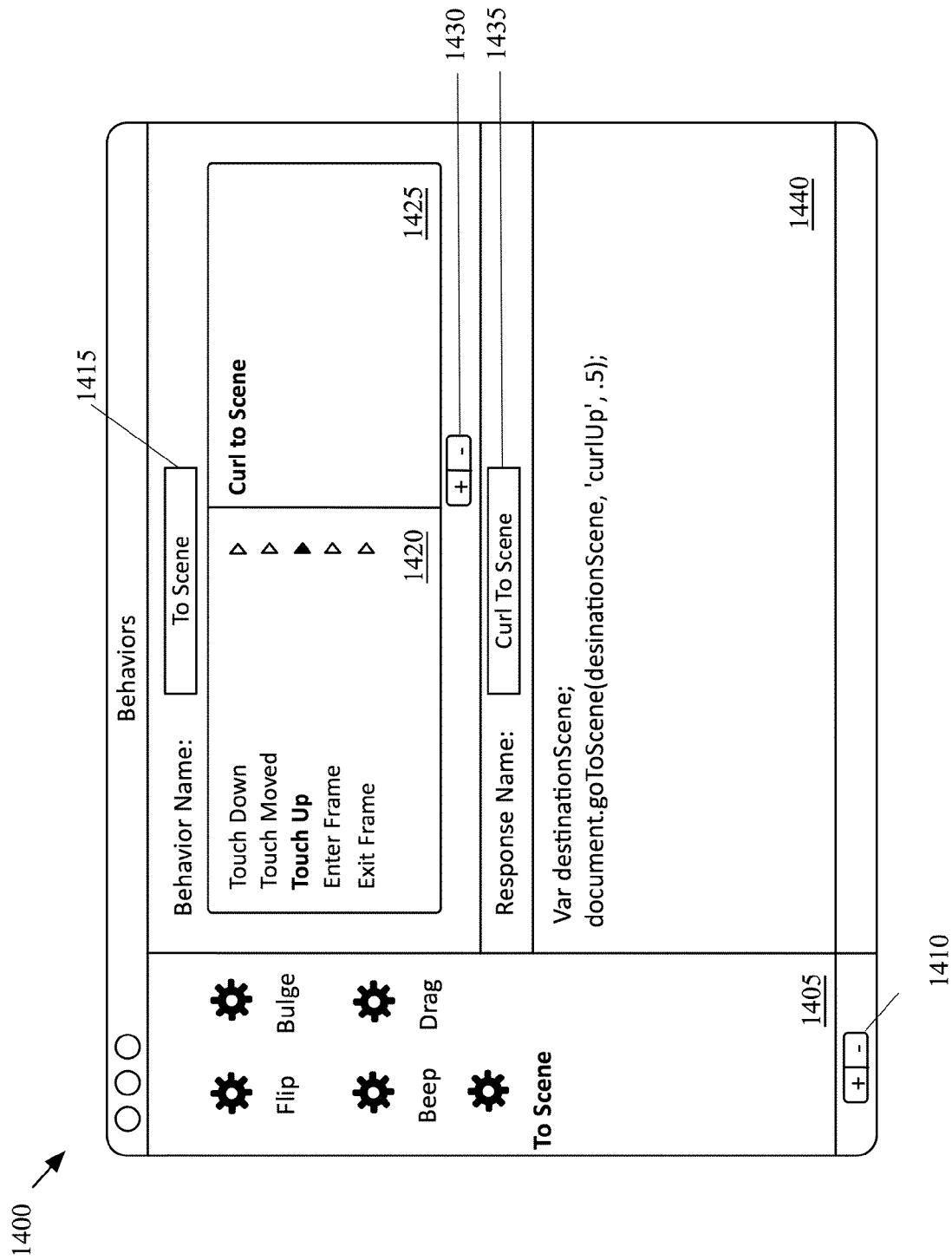
FIG. 14 conceptually illustrates a behavior editor of the authoring platform of some embodiments.

FIG. 14 conceptually illustrates a behavior editor 1400 of the authoring platform of some embodiments. The behavior editor 1400 allows a user of the authoring platform to create and modify behaviors for an application being built by the authoring platform. As shown, the behavior editor 1400 includes a behaviors pane 1405, an events column 1420, a responses column 1425, and a script editing area 1440. The behavior editor 1400 also includes add and delete buttons 1410 and 1430 and text panes 1415 and 1435. FIG. 14 also illustrates five behaviors in the behaviors pane 1405, five events in the events column 1420, one response in the responses column 1425, and a script code snippet in the script editing area 1440 as examples.

The behavior editor 1400 may be launched from a GUI of the authoring platform. For instance, the behavior editor 1400 can be launched by selecting a behavior listed in a behaviors library such as the behaviors library 620 of the GUI 600 described above by reference to FIGS. 6 and 7. The behavior editor 1400 may occupy a portion or the entirety of the GUI from which the behavior editor 1400 launched. The behavior editor may also be a separate window from the GUI. This separate window may be separately manipulated (i.e., closed, opened, resized, etc.). Also, in some embodiments, the behaviors pane 1405, the events column 1420, and the responses column 1425 are within the same behavior editor 1400 window as shown. In other embodiments, one or more of the behaviors pane 1405, the events column 1420, and the responses column 1425 may be a separate window. In some other embodiments, two of the behaviors pane 1405, the events column 1420, and the responses column 1425 may be in the same window.

The behaviors pane 1405 lists behaviors that can be edited in the behavior editor 1400. The behavior editor 1400 allows the user of the authoring platform to add a behavior to the behaviors pane 1405. For instance, the user can click on the plus sign of the add and delete button 1410 to add a behavior.

A graphical object (e.g., a gear-looking icon) appears in the behaviors pane when a new behavior is added in some embodiments. The behavior added in this manner may initially be an empty one with a default name. Events and responses may be added or defined through the events column 1420 and the responses column 1425. The user can also remove a behavior by selecting the behavior and clicking on the minus sign of the add and delete button 1410.

The behavior editor 1400 also allows the user to import and export behaviors to and from the behaviors pane 1405. The users may exchange behaviors with each other by exporting the behaviors to files and exchanging the files. The behaviors pane 1405 may also include predefined behaviors, which in some embodiments have been provided as part of the authoring platform. In some embodiments, the behaviors added to or deleted from the behaviors pane 1405 will also be added to or deleted from a behaviors library, such as the behaviors library 620. That is, the behaviors pane of a behavior editor and a behaviors library will maintain the same list of behaviors.

In order to edit a behavior, the user of the authoring platform can select a behavior in the behaviors pane 1405. This selection may involve clicking a mouse button or tapping a touchscreen to select a graphical object representing a behavior, selecting an option through keyboard input, etc. The behaviors pane 1405 provides a visual cue (e.g., different background color, bolding the name of the selected behavior, etc.) to indicate the selection of the behavior. For instance, the name of the "To Scene" behavior is bolded to indicate the selection of that behavior as shown.

When a behavior is selected in the behaviors pane 1405, the events column 1420 lists one or more events of the selected behavior. In some embodiments, the events column 1420 may list predefined events by default when the selected behavior is an empty behavior. The behavior editor 1400 also allows the user to create or add event definitions in the events column.

The five events examples listed in the events column 1420 define different interactions of the user with the entity with which the selected behavior would be associated. For instance, the "Touch Down" event is a touchdown event, which represents the user's placing a finger (or, pressing down a mouse button) on the entity. The "Touch Moved" event is an event that represents the user's moving the finger while touching the entity. The "Touch Up" event is a touchup event, which represents the user's lifting the finger from the entity. The "Enter Frame" event is an event that represents the user's moving the finger into the area occupied by the entity while keeping the finger's contact that was initiated outside the area. The "Exit Frame" event is an event that represents the user's moving the finger out of the area occupied by the entity while keeping the finger's contact.

In order to view the responses that are associated with an event, the user of the authoring platform can select an event in the events column 1420. This selection may involve clicking a mouse button or tapping a touchscreen to select the name of the event, selecting an option through keyboard input, etc. The events column 1420 provides a visual cue (e.g., different background color, bolding the name of the selected behavior, etc.) to indicate the selection of the event. For instance, the name of the "Touch Up" event is bolded to indicate the selection of that event as shown.

When an event is selected in the events column 1420, the responses column 1425 lists one or more responses that are associated with the selected event. For instance, the responses column 1425 displays the "Curl to Scene" response, which is a script response that is associated with the "Touch Up" event. The behavior editor 1400 also allows the user to create or add response definitions in the responses column 1425. For instance, the behavior editor 1400 allows the user of the authoring platform to add a response by clicking on the plus sign of the add and delete button 1430. A default response name appears in the responses column 1425 when a new response is added in some embodiments. The response added in this manner may initially be an empty one and do not have a type. The user may specify the response's type (e.g., a script response, an animation response, a complied code response, etc.) by, for example, prompting a dropdown menu and selecting an item representing a response type. The user can also remove a response by selecting the response in the responses column 1425 and clicking on the minus sign of the add and delete button 1430.

The behavior editor 1400 in some embodiments provides the script editing area 1440 in which the user can modify a script response. In order to edit a script response, the user can select a response listed in the responses column 1425. This selection may involve clicking a mouse button or tapping a touchscreen to select the name of the response, selecting an option through keyboard input, etc. When the response selected in the responses column 1425 is a script response, the behavior editor 1400 displays the script code on the script editing area 1440. In some cases, the behavior editor 1400 may display nothing or some default script snippet if the selected script response is an empty response.

The example script shown in the script editing area 1440 is a JavaScript snippet that defines the use of "destinationScene" variable. This variable can be visually linked to a scene. Visually linking a variable to a scene will be described below by reference to FIG. 16. This example script, when executed, causes the application to change the current scene to another scene upon receiving a touchup event on an entity with which "To Scene" behavior is associated.

The behavior editor 1400 in some embodiments provide other means (not shown) of editing for other types of responses. For instance, the behavior editor may launch or open within the behavior editor a key indices display area, such as the key indices display area of FIG. 9, for editing an animation response. Also, the behavior editor 1400 in some embodiments allows the user to change the names of behaviors and responses by typing in desired names in the text panes 1415 and 1435, respectively.

Figure 15:
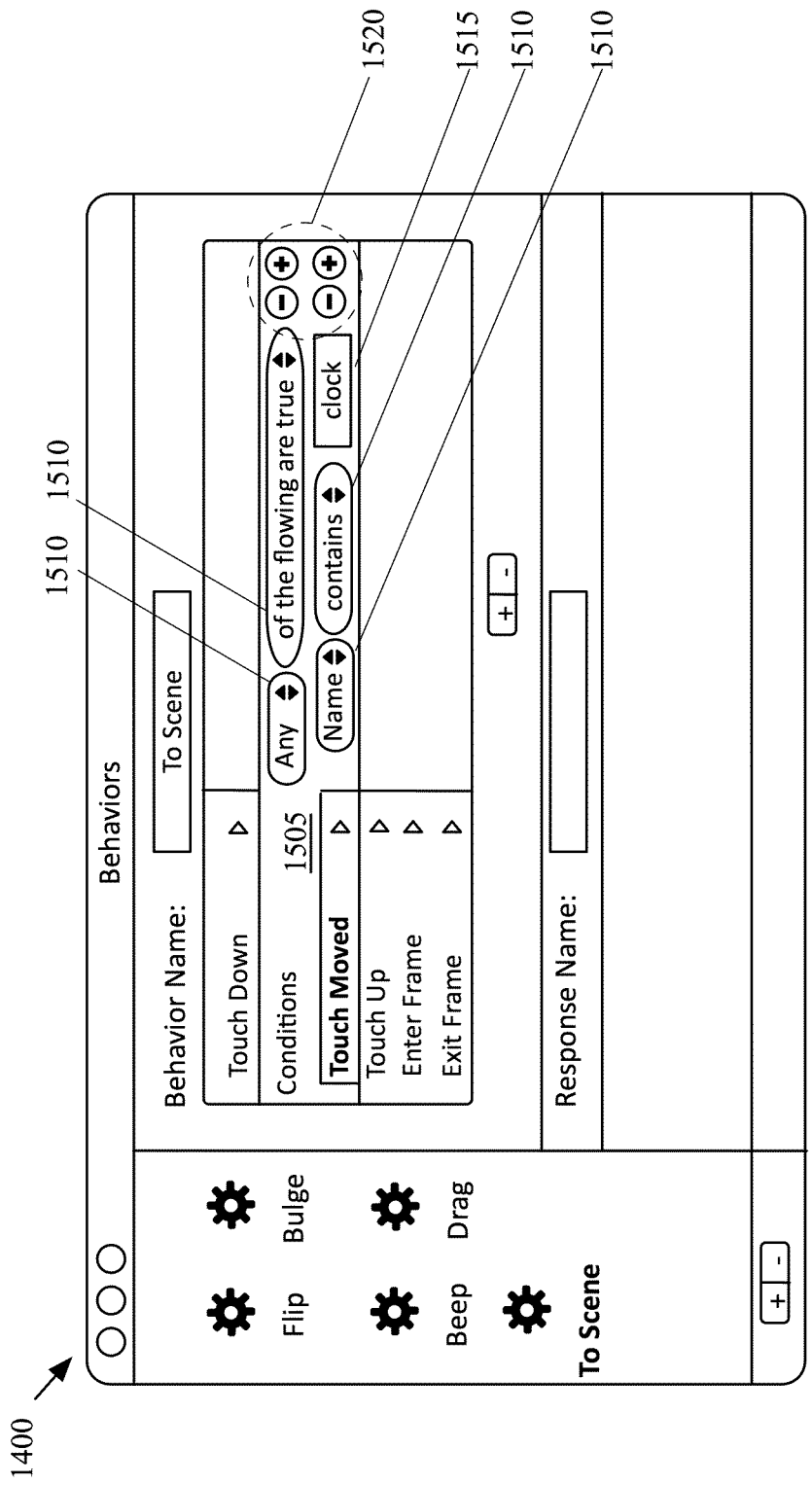
FIG. 15 illustrates a behavior editor of some embodiments.

FIG. 15 illustrates the behavior editor 1400 of FIG. 14. Specifically, FIG. 15 illustrates that the behavior editor 1400 allows the user of the authoring platform to add and edit conditions to an event. As described above, these conditions are associated with an event of a behavior and they have to be met in order for the event to trigger the responses associated with the event. In some embodiments, the conditions may relate to the properties of an entity with which the selected behavior is associated. For instance, the name of the entity may be a condition.

In some embodiments, the behavior editor 1400 provides a predicate editor 1505 for defining and adding conditions. The predicate editor 1505 in some embodiments includes a group of dropdown menus and a text pane. For instance, the predicate editor includes four drop down menus 1510 and a text pane 1515. Each dropdown menu contains a list of items that represent certain values. These items and values are predefined in some embodiments. The user can define different conditions by selecting different combinations of items from these dropdown menus and typing in desired texts. For instance, the combinations of the items and the typed in text as shown, "Any," "of the following are true," "name," "contains," "clock," constitute a condition requiring that the name of the entity should be "clock" in order for the touchup event on the entity to trigger the responses associated with the touchup event. The encircled plus and minus signs 1520 are for adding and removing dropdown menus and text panes.

The behavior editor 1400 in some embodiments displays the predicate editor 1505 when the user selects an event listed in the events column 1420. This selection may involve clicking a mouse button or tapping a touchscreen to select the name of the event, selecting an option through keyboard input, etc. For instance, the user may double-click on an event to launch the predicate editor 1505. The predicate editor 1505 occupies a portion or the entirety of the behavior editor 1400. The behavior editor may also be a separate window that can be separately manipulated from the behavior editor 1400.

The behavior editor 1400 in other embodiments provide other means of defining and editing conditions. For instance, the behavior editor 1400 may provide a script editing area for creating and/or editing conditions. However, the behavior editor 1400 in some embodiments provides the predicate editor 1505 in order to make it easier for the user of the platform to author an application. For instance, a user may be able to author applications without getting familiar with writing scripts or without much knowledge in programming.

B. Visually Associating Visual Assets and Non-Visual Assets

Figure 16:
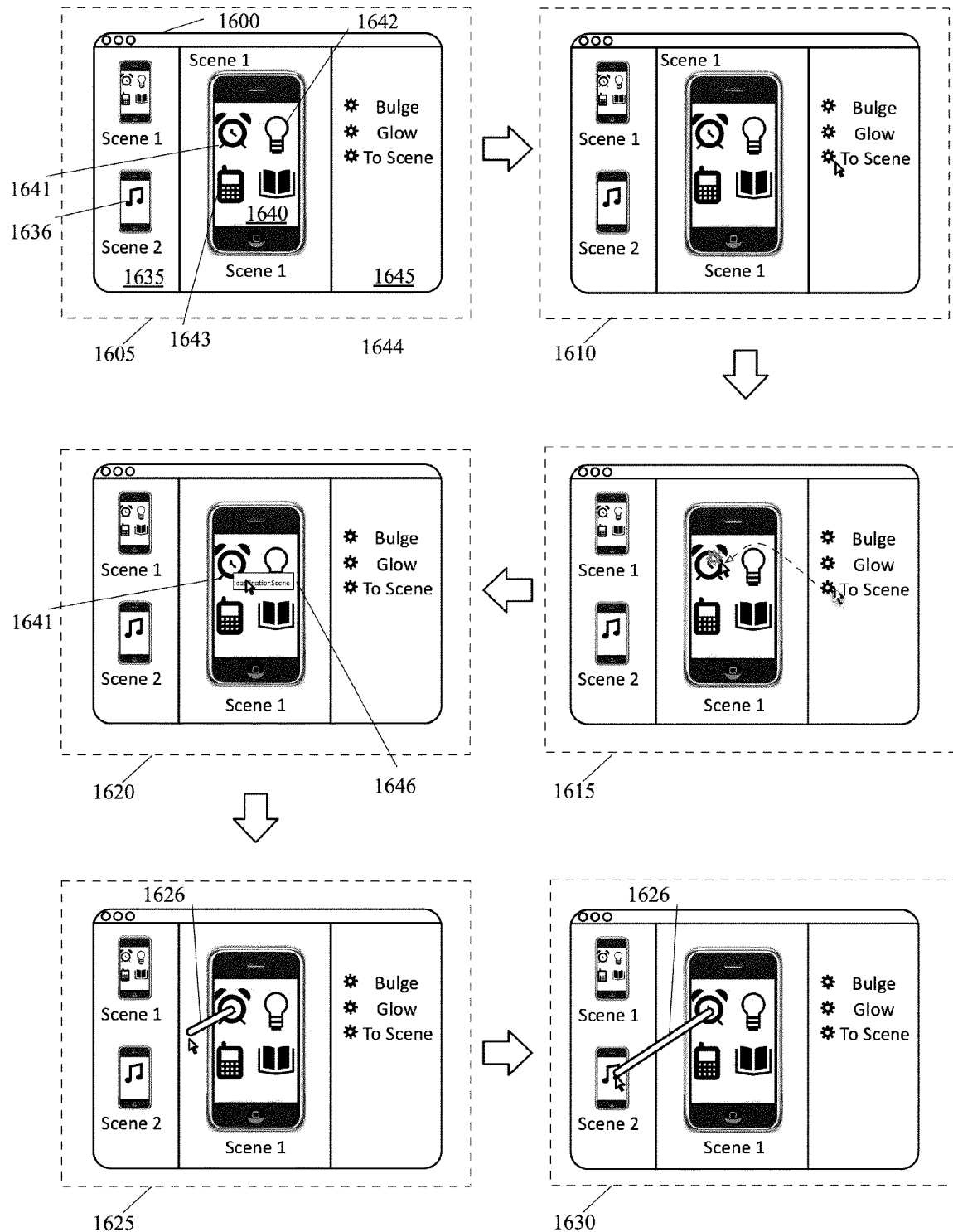
FIG. 16 conceptually illustrates a GUI of the authoring platform of some embodiments.

FIG. 16 conceptually illustrates a GUI 1600 of the authoring platform of some embodiments. Specifically, this figure illustrates in six different stages 1605-1630 that the GUI allows a user of the platform to associate a behavior having a script response with an entity of a scene being edited. As shown, the GUI 1600 includes a scenes pane 1635, a scene preview area 1640, and a behaviors library 1645.

The scenes pane 1635 in some embodiments is an area of the GUI 1600 that lists the scenes of an application that is being authored by the authoring platform. Scenes may be added to and deleted from the application and the scenes pane 1635 lists different sets of scenes accordingly. The scenes pane 1635 displays the scenes as small thumbnail images with scene names in some embodiments. For instance, the scenes pane 1635 displays scenes 1 and 2 as small thumbnail images showing entities of the scene. The scene 2 thumbnail shows that the scene 2 includes an entity 1636.

The scene preview area 1640 is similar to the scene preview area 615 described above by reference to FIG. 6. The scene preview area 1640 displays a scene of the application being built. The user can create or modify the scene by adding or deleting entities (e.g., a graphical icon or an image) to and from the scene preview area 1640. In some embodiments, the scene preview area 1640 may also display playback of the scene. In addition, the scene preview area 1640 in some embodiments encloses the scene preview area 1640 with a frame that represents a device on which the application would be running. The scene preview area 1640 displays a scene that is selected in the scenes pane 1635.

The behaviors library 1645 is similar to the behaviors library 620 described above by reference to FIG. 6. In some embodiments, the GUI 1600 allows the user of the authoring platform to associate an entity and a behavior by dragging a graphical object representing the behavior and dropping it onto an entity displayed in the scene preview area 1640. When the behavior that is associated with the entity has a script response with a variable that represents an entity or a scene, the GUI 1600 allows the user to graphically link the variable with an entity or a scene. For instance, the "To Scene" behavior includes a script response, which, when executed, causes the application to change the current scene to another scene upon receiving a touchup event on an entity with which "To Scene" behavior is associated.

At the first stage 1605, the scene preview area is displaying scene 1. As shown, the scene 1 includes four entities 1641-1644. The scenes pane 1635 lists scenes 1 and 2. The behaviors library 1645 lists three behaviors, "Bulge," "Glow," and "To Scene." At the second stage 1610, the user of the authoring platform selects the "To Scene" behavior. This selection may involve clicking a mouse button or tapping a touchscreen to select a graphical object representing a behavior, selecting an option through keyboard input, etc.

At the third stage 1615, the user of the authoring platform drags the "To Scene" behavior over the entity 1641. In some embodiments, as the user moves the cursor while a behavior is selected, the GUI 1600 shows the graphical object (e.g., a gear-looking icon) along the path of the cursor in order to provide a visual cue. When the graphical object hovers near an icon, the GUI may provide another visual cue (e.g., a different background color for the icon) to indicate that the behavior represented by the graphical object will be associated with the icon once the graphical object is dropped there. The user drops the graphical object representing the "To Scene" behavior onto the entity 1641. As a result, the icon 1641 is associated with the "To Scene" behavior.

At the fourth stage 1620, the user selects the entity 1641 to view the variables associated with the script response of the "To Scene" behavior. For instance, the user right-clicks the entity 1641 on the scene preview area 1640. Upon receiving the selection of the entity, the GUI 1600 in some embodiments prompts a drop-down menu 1646 from which the user can select an item representing a variable. The dropdown menu 1646 lists an item for a variable that represents a scene to change to and the user selects it.

At the fifth stage 1625, upon the user's selection of the item in the menu 1646, the GUI 1600 displays a bar 1626. One end of the bar is anchored on the entity 1641. The GUI 1600 allows the user to extend this bar by dragging the other end of the bar. At the sixth stage 1630, the user extends the bar 1626 to the scene 2 listed in the scenes pane 1635. In some embodiments, the GUI provides a visual cue (e.g., a different background color) to indicate that the variable's value is set to the scene 2.

Figure 17:
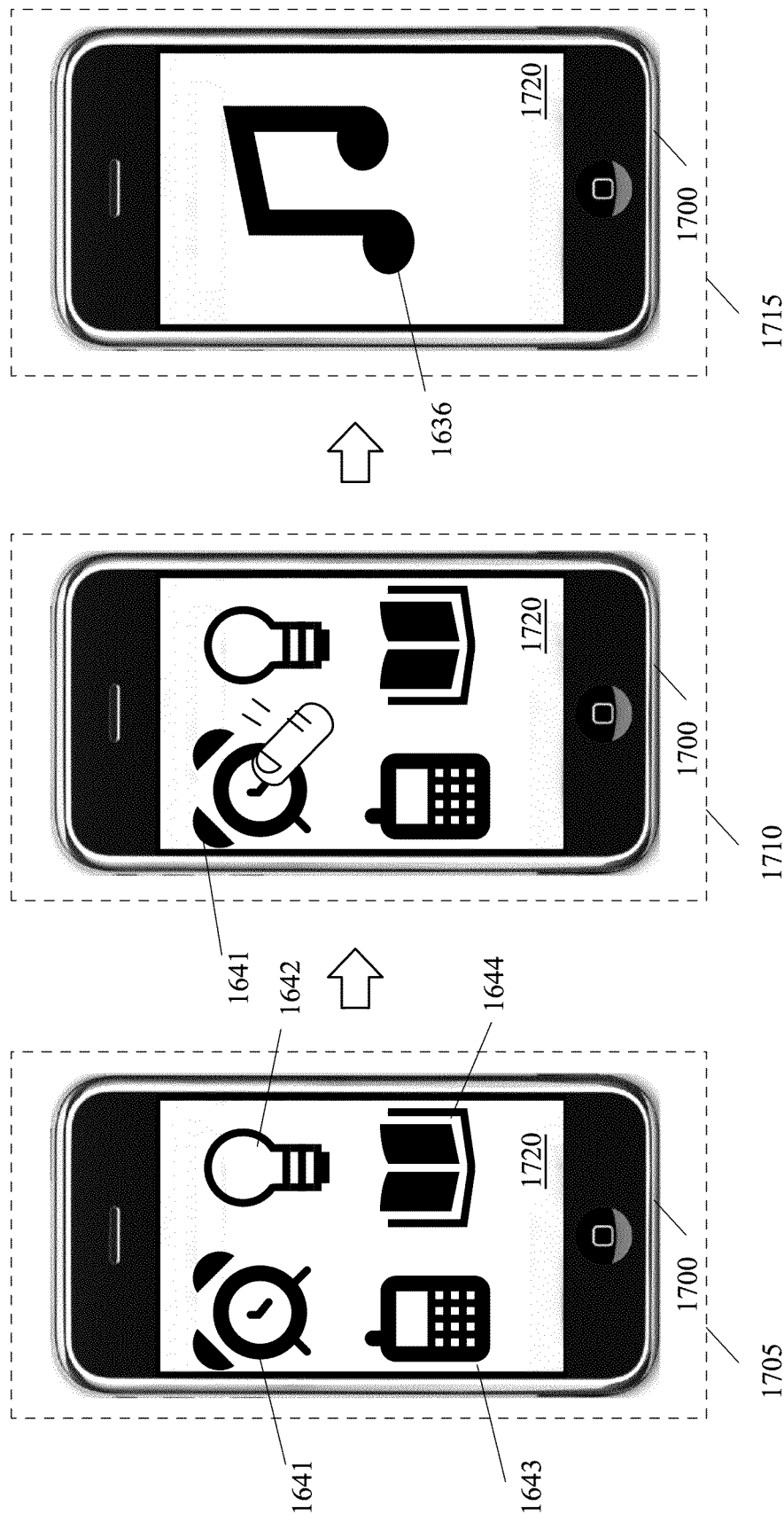
FIG. 17 conceptually illustrates a device that runs the application.

FIG. 17 conceptually illustrates a device 1700 that runs the application described above by reference to FIG. 16. Specifically, FIG. 17 illustrates in three different stages 1705-1715 that the application executes the response of the "To Scene" behavior upon receiving a touchup event on the entity 1641. The device 1700 in some embodiments has a memory (not shown) to store the application and a processor (not shown) to run instructions of the application. The device 1700 also has a display area 1720 that can display scenes of the application. The display area 1720 is capable of detecting user's touch. More details about a device like the device 1700 will be described further below by reference to FIG. 25.

At the first stage 1705, the device 1600 is running the application. Specifically, the display area 1720 displays the scene 1 of the application. That is, the display area 1720 displays the four entities 1641-1644. As mentioned above, the entity 1641 is associated with the "To Scene" behavior. At the second stage 1710, a user of the application touches the entity with her finger and lifts it up. As the user lifts up her finger, the application receives a touchup event from an operating system that runs on the device 1700. The application then performs a process such as the process 1200 described above by reference to FIG. 12 to execute the response that is associated with the touchup event. At the third stage 1715, the application switches to the scene 2 described above by reference to FIG. 16. Thus, the display area 1720 displays the entity 1636.

C. Key-Indexed Graphs

Figure 18:
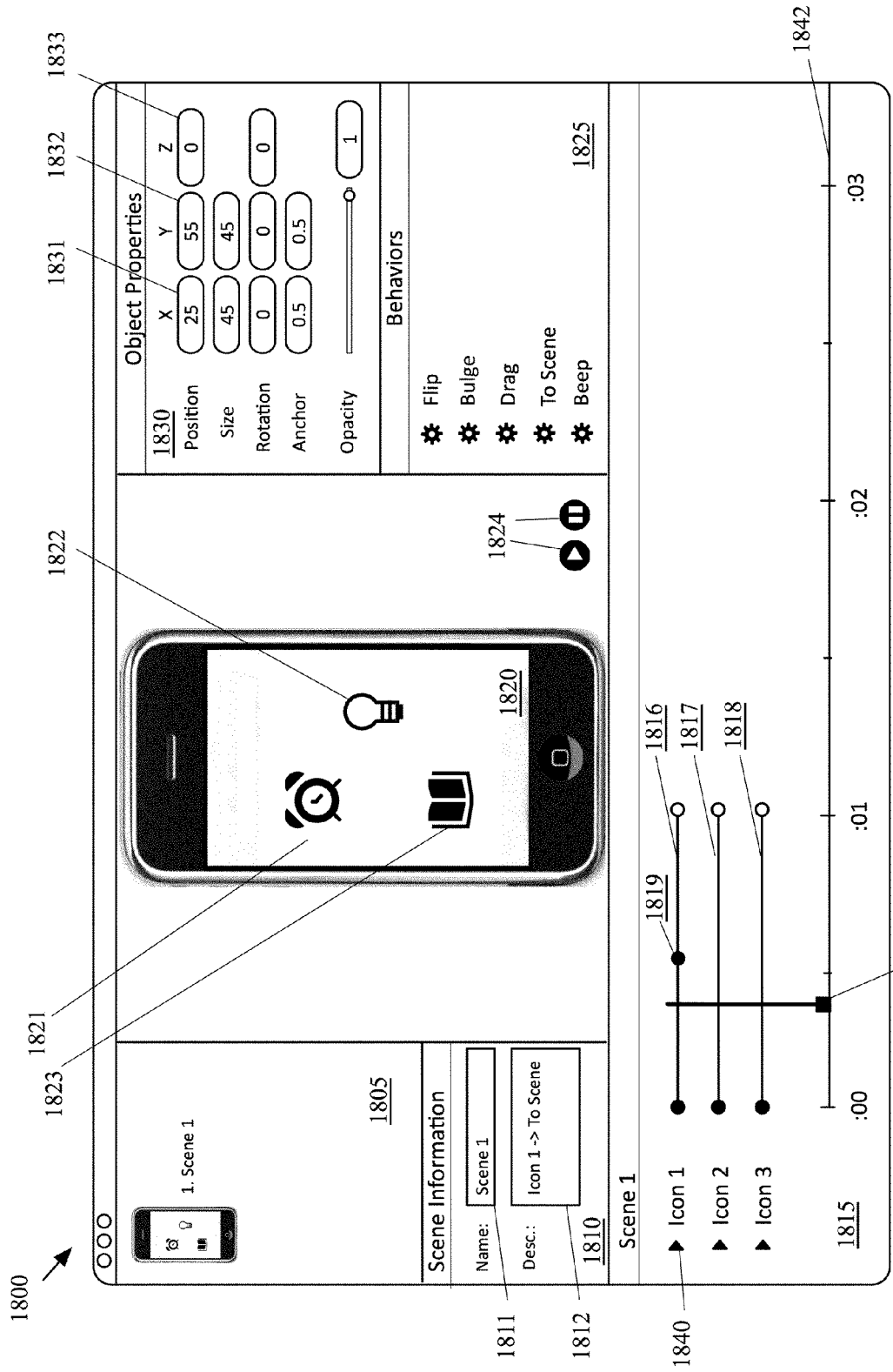
FIG. 18 conceptually illustrates a GUI of the authoring platform of some embodiments.

FIG. 18 conceptually illustrates a GUI 1800 of the authoring platform of some embodiments. Using the GUI 1800, a user of the authoring platform builds interactive applications by specifying scenes, entities, and behaviors, etc. As shown in the figure, the GUI 1800 includes a scenes pane 1805, a scene information pane 1810, a scene preview area 1820, an entity properties editor 1830, a behaviors library 1825, and a key indices display area 1815.

The scenes pane 1805 is similar to the scenes pane 1635 described above by reference to FIG. 16. The scenes pane 1805 in some embodiments is an area of the GUI 1800 that lists the scenes of an application that is being authored by the authoring platform. Scenes may be added to and deleted from the application and the scene pane 1805 lists different sets of scenes accordingly. The scenes pane 1805 displays the scenes as small thumbnail images with scene names in some embodiments. For instance, the scenes pane 1805 displays an example scene 1 as a small thumbnail image showing entities of the scene.

The scene information 1810 displays information about a scene selected in the scenes pane 1805. For instance, the scene information pane 1810 includes two text panes 1811 and 1812. In the text pane 1811, the GUI 1800 displays the name of the selected scene. The GUI 1800 allows the user to type in a desired name should the user want to change the name of the selected scene. In the text pane 1812, the GUI 1800 displays the description of the selected scene. The user can type in a desired description for the selected scene.

The behaviors library 1825 is similar to the behaviors library 1645 described above by reference to FIG. 16. The behaviors library 1825 displays a list of behaviors that are represented as graphical objects. For instance, the behaviors library 1825 display a gear-looking icon next to the name of a behavior. In some embodiments, the behaviors library 1825 displays predefined behaviors.

The scene preview area 1820 is similar to the scene preview area 1640 described above by reference to FIG. 16. The scene preview area 1820 displays a scene of the application being built by the authoring platform. The user can modify the scene by adding or deleting entities (e.g., a graphical icon or an image) to and from the scene preview area 1820. The scene preview area 1820 displays a scene that is selected in the scenes pane 1805. For instance, the scene preview area 1820 displays entities 1821-1823 of the scene 1 that is currently selected in the scenes pane 1805. In some embodiments, the scene preview area 1820 may also display playback of the scene. That is, the GUI 1800 can simulate the execution of the application being built within the scene preview area 1820.

The scene preview area 1820 in some embodiments encloses the scene preview area 1820 with a frame that represents the appearance of a device on which the application would be running. In some embodiments, the GUI 1800 provides different frames for different devices so that the user can replace the frame enclosing the scene preview area 1820 with another frame of another device. Also, the GUI 1800 allows the user to change the orientation (e.g., portrait or landscape) of the scene preview area 1820.

In some embodiments, the GUI 1800 allows the user to associate an entity displayed in the scene preview area 1820 and a behavior in the behaviors library 1825 by dragging a graphical object representing the behavior and dropping it onto the entity. When the behavior that is associated with the entity has a script response with a variable that represents an entity or a scene, the GUI 1800 allows the user to graphically link the variable with an entity or a scene. An example of such graphical linking is described above by reference to FIG. 16.

The key indices display area 1815 is similar to the key indices display area 820 described above by reference to FIG. 8. The key indices display area 1815 displays a key-indexed graph for each of the entities of the scene that is selected in the scenes pane 1805. For instance, the key indices display area 1815 is displaying three key-indexed graphs 1816-1818 for the entities 1821-1823, respectively, of the scene 1. The names of the entities 1821-1823 are "Icon 1," "Icon 2," and "Icon 3," respectively.

The key indices display area 1815 includes a time code line 1842 for indicating duration of each key-indexed graph and temporal positions of key indices along the key-indexed graphs 1816-1818. For instance, each of the key-indexed graph 1816-1818 has a duration of a second. The key index handle 1819 is placed on the key-indexed graph 1816 around 0.6 second.

In some embodiments, the GUI 1800 allows the user of the authoring platform to place handles for key indices on the key-indexed graph. As mentioned above, a pair of key indices on a key-indexed graph represents a start and an end of an animation for an entity (e.g., an icon) of a scene. Different embodiments have different ways of adding handles for key indices. For instance, the GUI 1800 of some embodiments provides a playhead 1841. The user can move the playhead 1841 horizontally along the key-indexed graph to select a position to add a handle. The user can add a handle for a key index by selecting a position along the key-indexed graph and then moving the corresponding entity to a new location within the scene preview area 1820. Once the user moves the entity, a handle will appear at the selected position on the key-indexed graph. Instead of moving the corresponding entity to a new location in the scene preview area, the user can also enter different values for properties of the entity in the entity properties editor 1830. That is, the user can first select a position along the key-indexed graph with the playhead 1841 and then type in the position values (e.g., coordinates values) for the entity displayed in the scene preview area 1820. As different values are entered, a handle will appear at the selected position on the key-indexed graph.

In some embodiments, the playhead 1841 moves along the key-indexed graph as the selected scene is played back in the scene preview area 1820. The 8UI in some embodiments provides a playback control buttons 1824 for the user to control the playback of the selected scene.

The entity properties editor 1830 includes a group of text panes in which the user can type in numerical values to modify each property of an entity. For instance, three text panes 1831-1833 are for x, y, and z coordinates of an entity displayed in the scene display area 1820. In some embodiments, the GUI allows the user to edit the properties of the entity at a key index. The user can select a key index and modify the property values using the entity properties editor 1830.

Figure 19:
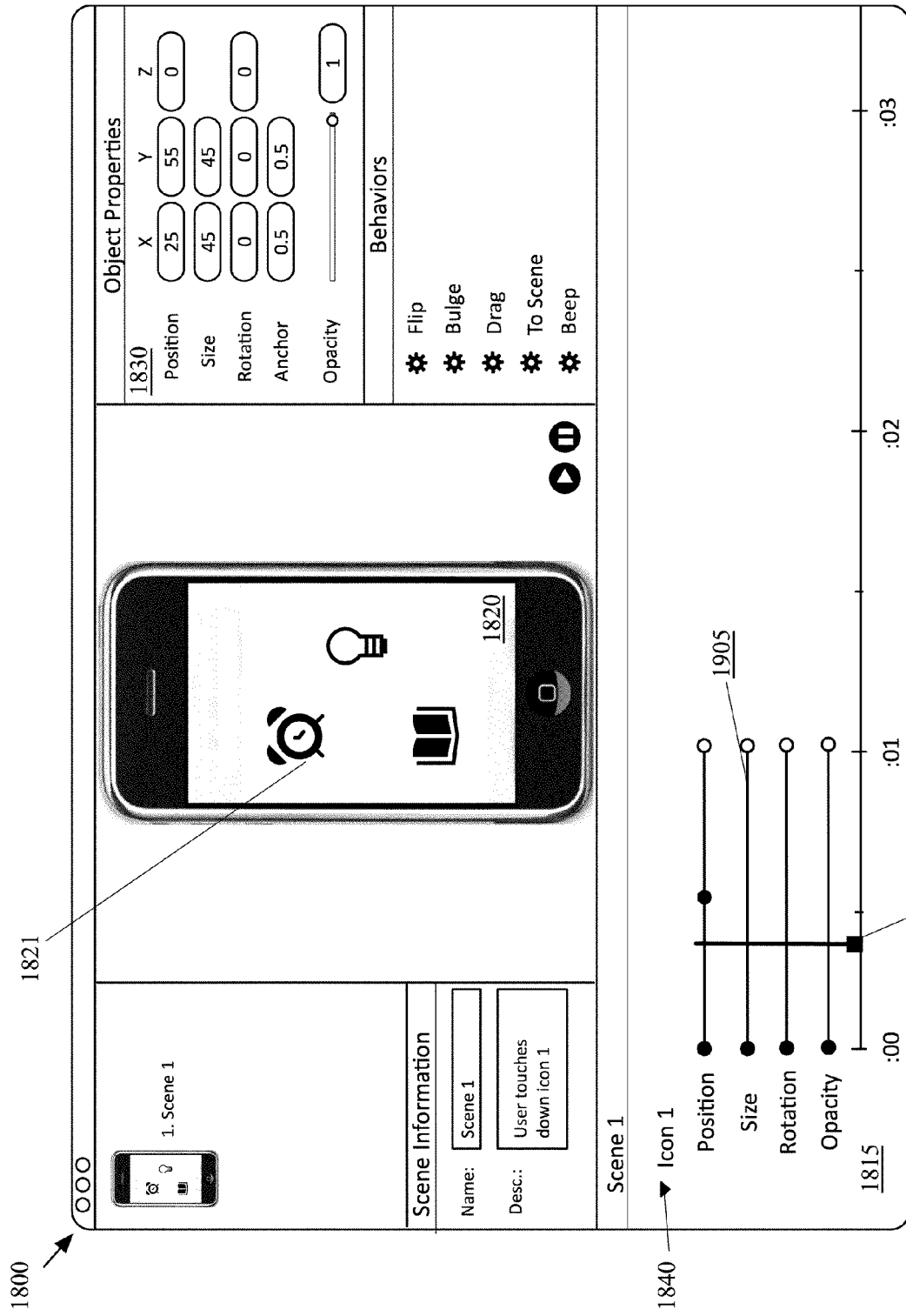
FIG. 19 conceptually illustrates a GUI of the authoring platform of some embodiments.

FIG. 19 illustrates the GUI 1800 of FIG. 18, except the key indices display area 1815 displays sub-key-indexed graphs for the properties of the entity 1821. Not all of sub-key-indexed graphs for the properties are depicted in this figure for simplicity of description. By providing a sub-key-indexed graph for each of the properties of an entity, the GUI 1800 allows the user to control each property of the entity by adding and editing key indices to the sub-key-indexed graph.

The GUI 1800 in some embodiments allows the user to expand a key-indexed graph for an entity by selecting the key-indexed graph for the entity. This selection may involve clicking a mouse button or tapping a touchscreen to select the key-indexed graph, selecting an option through keyboard input, etc. For instance, the user may click on an expansion indicator 1840 to cause the key indices display area 1815 to display sub-key-indexed graphs for the properties of the entity 1821. The properties of an entity in some embodiments include a position, a scale, a rotation, a color, etc. to name a few.

In some embodiments, the GUI 1800 allows the user of the authoring platform to place handles for key indices on the sub-key-indexed graphs in a similar manner to add key indices to the key-indexed graphs for the entities. For instance, the user can add a handle for a key index on the sub-key-indexed graph 1905 which is for the size property of the entity 1821. The user can first select a position along the sub-key-indexed graph 1305 with the playhead 1841 and then specify a desired size (e.g., by grabbing an edge and stretching/shrinking) of the icon 1821 in the scene preview area 1820. A new handle for a key index will appear on the selected position. When the scene is played back, the size of the entity 1821 will gradually stretch or shrink to the desired size at the time specified by the handle for the key index. In a similar manner, the user can add handles for key indices to other sub-key-indexed graphs for other properties of the entity 1821.

Having described several GUI tools for editing an authored application, the next Section III will now describe merging responses using some of those GUI tools.

III. Merging Responses

Figure 20:
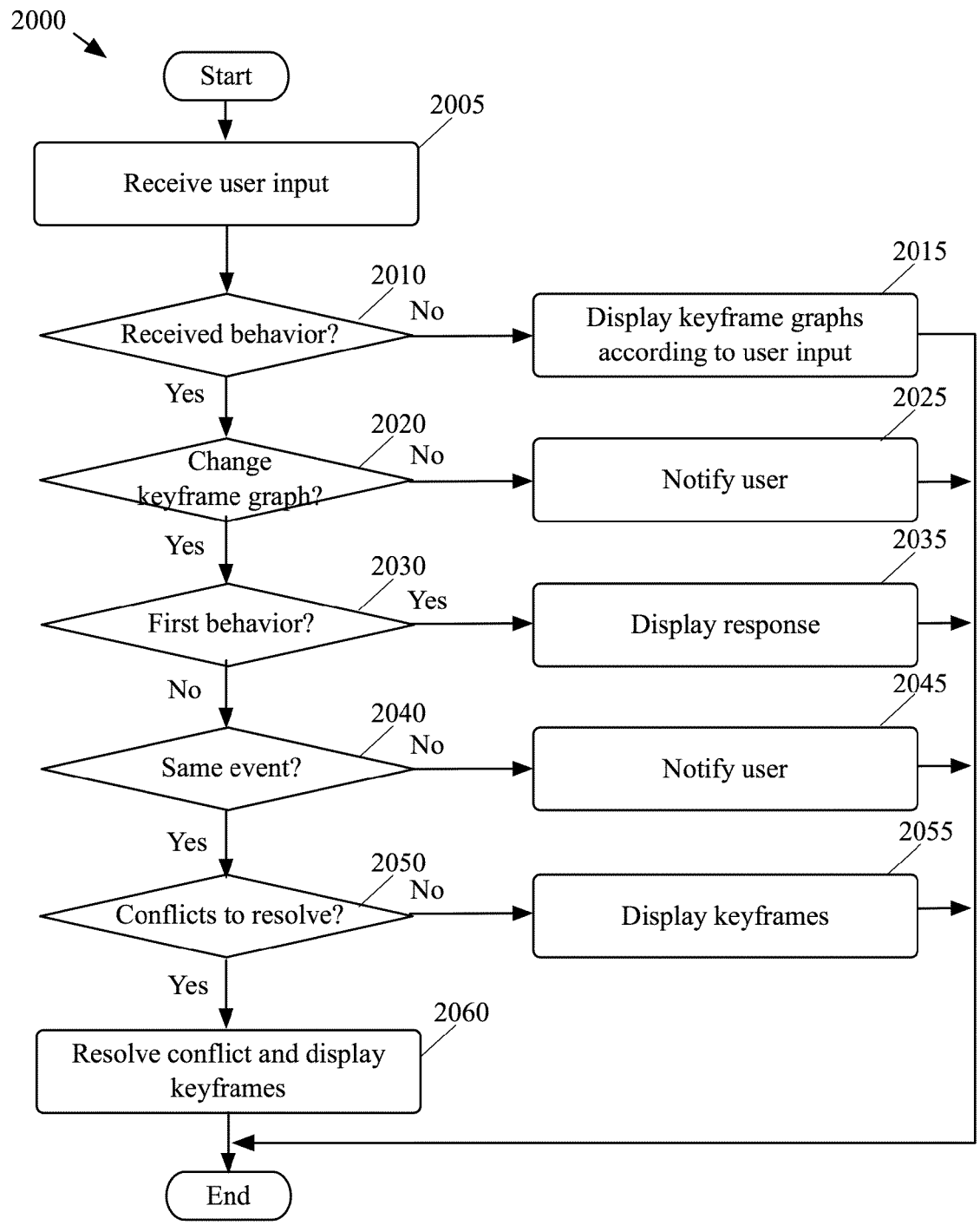
FIG. 20 conceptually illustrates a process that some embodiments perform to manage a key indices display area.
Figure 21:
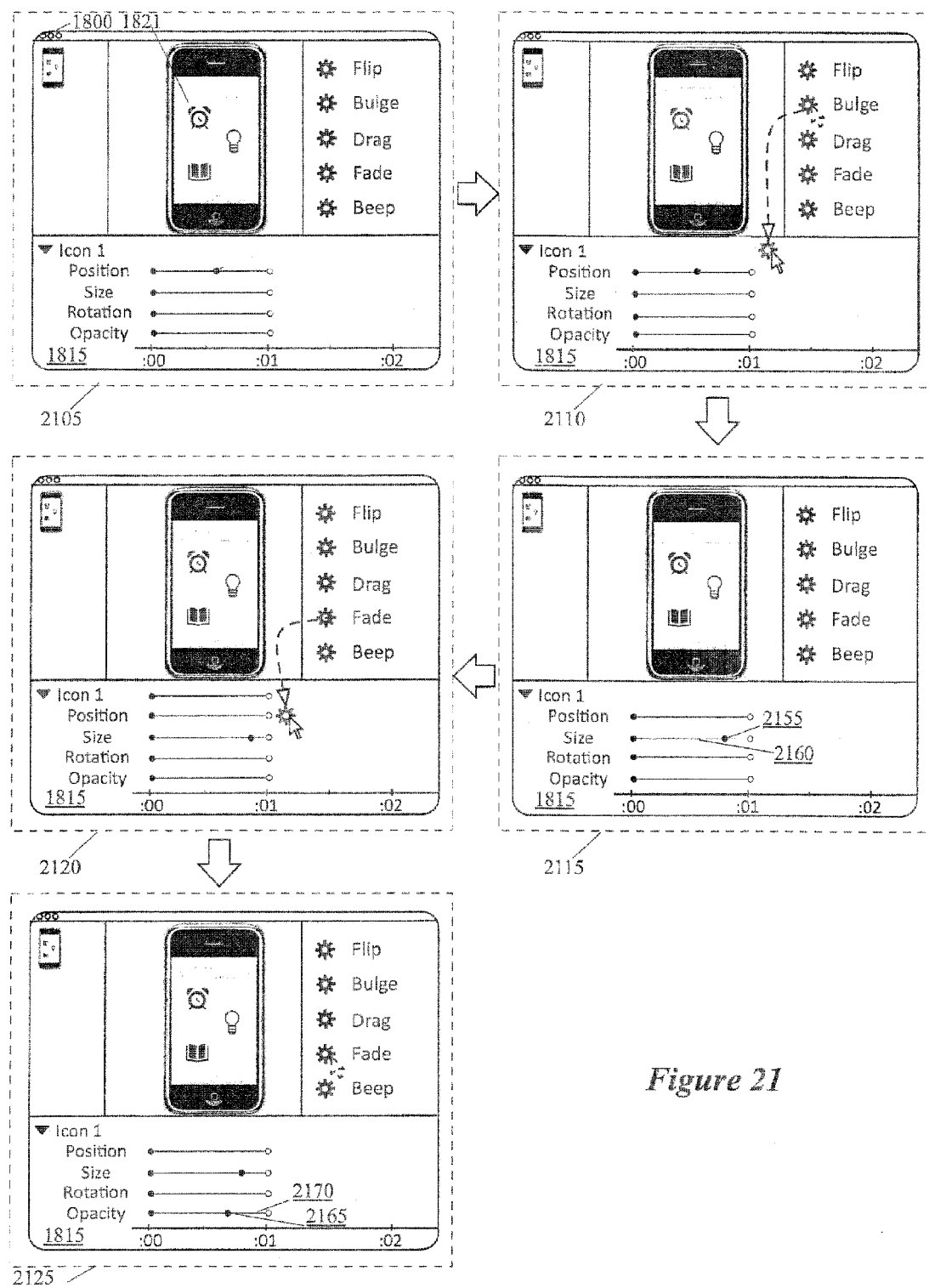
FIG. 21 illustrates merging two different animation responses of two different behaviors in the sub-key-indexed graphs of a GUI in some embodiments.

FIG. 20 conceptually illustrates a process 2000 that some embodiments perform to manage a key indices display area. Specifically, some embodiments perform the process 2000 in order to combine several responses in the key-indexed graphs displayed in the key indices display area. In some embodiments, the process 2000 is performed by a GUI of the authoring platform of some embodiments such as the GUI 1800. The process 2000 will be described with reference to FIG. 21. FIG. 21 illustrates in five different stages 2105-2125 merging two different animation responses of two different behaviors in the sub-key-indexed graphs of the GUI 1800 described above by reference to FIG. 18. FIG. 21 illustrates the GUI 1800 of FIG. 18, except that FIG. 21 does not illustrate all components of the GUI 1800 for the simplicity of description.

The process 2000 begins by receiving (at 2005) a user input regarding the key indices display area. The user input may be selecting a scene to cause the key indices display area to display the entities of the scene, expanding a key-indexed graph into sub-key-indexed graphs, adding/deleting/moving handles from key-indexed graphs, dropping of a behavior onto a key indices display area, etc. At the first stage 2105 of FIG. 21, the user has selected the scene 1 and expanded the key-indexed graph for the entity 1821 into the sub-key-indexed graphs for the properties of the entity 1821. As described above, the entity 1821 is an icon named "Icon 1."

Next, the process 2000 determines (at 2010) whether the process has received a behavior into the key-indexed graph. The process 2000 in some embodiments determines that it has received a behavior when the user drags and drops a graphical object representing the behavior into the key-indexed graph. At the second stage 2110 of FIG. 21, the user has selected and dragged "Bulge" behavior over the key indices display area 1815 near the sub-key-indexed graphs for the entity 1821 and dropped it. In this example, the "Bulge" behavior includes an animation response with the same name "Bulge." This animation response, when executed, changes the size of the entity associated with the "Bulge" behavior by enlarging the entity. As mentioned above, an animation response may include a set of key indices. Since the "Bulge" response will cause the entity to change the size, this response has one or more key indices on the sub-key-indexed graph for the size property of the entity.

Returning to FIG. 20, when the process 2000 determines (at 2010) that the process has not received a behavior, the process proceeds to 2015 to display the key-indexed graphs in the key indices display area according to the received action. For instance, the process will display the key-indexed graphs for entities of a different scene when the user has selected a different scene to edit.

When the process 2000 determines (at 2010) that the process has received a behavior, the process determines (at 2020) whether it is necessary to change the key-indexed graphs. The process 2000 in some embodiments determines that key-indexed graph changes are necessary when the received response requires to place key indices in the key-indexed graphs. For instance, when the received response is an animation response, the process determines that key-indexed graph changes are necessary. Also, when the received response is a type of response other than an animation response but still requires placing key indices in the key-indexed graphs, the process determines that key-indexed graph changes are necessary. For instance, a script response written in such a way that results in animating the entity would require to place key indices in the key-indexed graph.

When the process 2000 determines (at 2020) that the received response does not require to change the key-indexed graph, the process 2000 proceeds to 2025 to notify the user that the behavior that was brought into the key-indexed graph does not require key-indexed graph changes. Different embodiments notify the user differently. For instance, the process 2000 in some embodiments prompts a message indicating that the received behavior does not require key-indexed graph changes.

When the process 2000 determines (at 2020) that the received behavior requires key-indexed graph changes, the process determines (at 2030) whether the received behavior is the first behavior that the key-indexed graphs have received. When the process determines (at 2030) that the received behavior is the first behavior that is brought into the time display area, the process displays (at 2035) the response of the behavior that requires key-indexed graphs changes. The process displays the response by placing the key indices of the response in the appropriate key-indexed graphs or sub-key-indexed graphs.

For instance, at the third stage 2115 of FIG. 21, the "Bulge" behavior is the first behavior that was brought into the key indices display area for the entity 1821's sub-key-indexed graphs. The "Bulge" response of the "Bulge" behavior has one key index for the size property of the entity 1821. Accordingly, a handle 2155 for the one key index is placed on sub-key-indexed graph 2160 as shown. In some embodiments, the key indices display area 1815 switches to a different view when it displays key indices for a response. This view is for displaying the key-indexed graphs and sub-key-indexed graphs for the duration of the response only. That is, the beginning of each sub-key-indexed graph represents the moment that the entity receives the event associated with the response, not the beginning of a scene. In some embodiments, the key indices display area 1815 provides a visual cue to indicate that the key indices display area 1815 is displaying a response, not a scene. For instance, the key indices display area 1815 may display texts saying that the key indices display area 1815 is displaying a response or may use different background colors.

Returning to FIG. 20, when the process 2000 determines (at 2030) that the received behavior is not the first behavior received (i.e., that the key indices display area is already displaying one or more responses), the process 2000 determines (at 2040) whether the response of the behavior just received and the responses that are already displayed in the key indices display area are associated with the same event. When the process 2000 determines (at 2040) that these responses are not associated with the same event, the process 2000 proceeds to 2045 to notify the user that these responses are not associated with the same event and therefore cannot be merged.

At the fourth stage 2120 of FIG. 21, the user has selected and dragged "Fade" behavior over the key indices display area 1815, which is displaying "Bulge" response of the "Bulge" behavior. In this example, the "Fade" behavior includes an animation response with the same name "Fade." This animation response, when executed, changes the opacity of the entity associated with the "Fade" behavior such that the entity appears to be fading. Since the "Fade" response will cause the entity to change the opacity only, this response has one or more key indices on the sub-key-indexed graph for the opacity property of the entity.

When the process 2000 determines (at 2040) the response just brought in and the responses displayed in the key indices display area are associated with the same event, the process 2000 then determines (at 2050) whether there are conflicts to resolve with regards to placing the key indices of the response just brought in. That is, a key index of that response may be for the sub-key-indexed graph that already has other key indices placed or may even overlap with another existing key index. The process 2000 would have to determine what to do with the key indices. When the process 2000 determines (at 2050) that there are no conflicts to resolve, the process 2000 proceeds to 2055 and place the key indices of the response just brought in at the appropriate positions along the key-indexed graphs or sub-key-indexed graphs.

At the fifth stage 2125 of FIG. 21, the "Fade" behavior is not the first behavior that was brought into the key indices display area 1815 for the entity 1821's sub-key-indexed graphs. The "Fade" response of the "Fade" behavior has one key index for the opacity property of the entity 1821. Moreover, there is no existing key index in sub-key-indexed graph 2170 for the opacity property of the entity 1821. Accordingly, a handle 2165 for the one key index is placed on the sub-key-indexed graph 2170 as shown.

When the process 2000 determines (at 2050) that there are conflicts to resolve, the process 2000 proceeds to 2060 to resolve the conflicts. For instance, when a particular key index of the response just brought in overlaps with an existing key index, the process 2000 in some embodiments may (1) keep only the existing key index in the key-indexed graph, (2) place the particular key index in the key-indexed graph and remove the existing key index from the key-indexed graph, or (3) composite the two key indices (e.g., by taking a mean of the values represented by the two key indices). When the particular key index and existing key indices fall in the same key-indexed graph, the authoring platform of different embodiments may (1) keep the existing key indices only, (2) keep the key indices of the response being dropped, or (3) keep all of the key indices in the key-indexed graph. The process 2000 then ends.

IV. Automatically Detecting Boundaries

As mentioned above, the authoring platform of some embodiments is used by application developers to develop applications that run on devices. In order for the developed applications function properly, the applications have to meet the specifications of the devices. For instance, the scenes of an application would have to meet the specifications for the output video of a device. For example, a device may output its video as a rectangular shape with certain height, width, corner roundness, etc., and a scene's height, width, corner roundness, etc. have to match those of the output video of the device.

In some cases, the device manufacturers provide the application developers with the output video specifications during an initial phase of designing the devices so that application developers can develop the applications to run on the devices in parallel. However, it is often the case that the output video specifications for the devices get changed before the manufacturer finalizes the design of the device. Also, the manufacturers may change the video output specifications for the devices for the next versions of the devices. In such cases, the applications developers may have to comply with the changes to the video output specifications in order to ensure the proper functioning or rendering of the scenes of the applications. Complying with those changes may involve performing substantial and resource-consuming tasks.

The authoring platform of some embodiments enables the applications being authored to detect some of the video output specifications automatically so that the developers do not have to modify their applications to comply with changes to those video output specifications. In particular, the applications authored by the authoring platform will automatically detect boundaries of a transparent area in an image provided by a device manufacturer. In some embodiments, the boundaries of the transparent area of the image serve as a video output specification of a device that the device manufacturer makes. For instance, the device is designed to output its video as a rectangular shape with certain height, width, corner roundness, etc., and the manufacturer conveys this dimensional information to the applications developers as a rectangular image with a transparent area having the certain height, width, corner roundness, etc. In some embodiments, an image provided by the manufacturer is in a format that supports transparency. For instance, some embodiments use a Portable Network Graphics (.png) or a Tagged Image File Format (.tiff).

Figure 22:
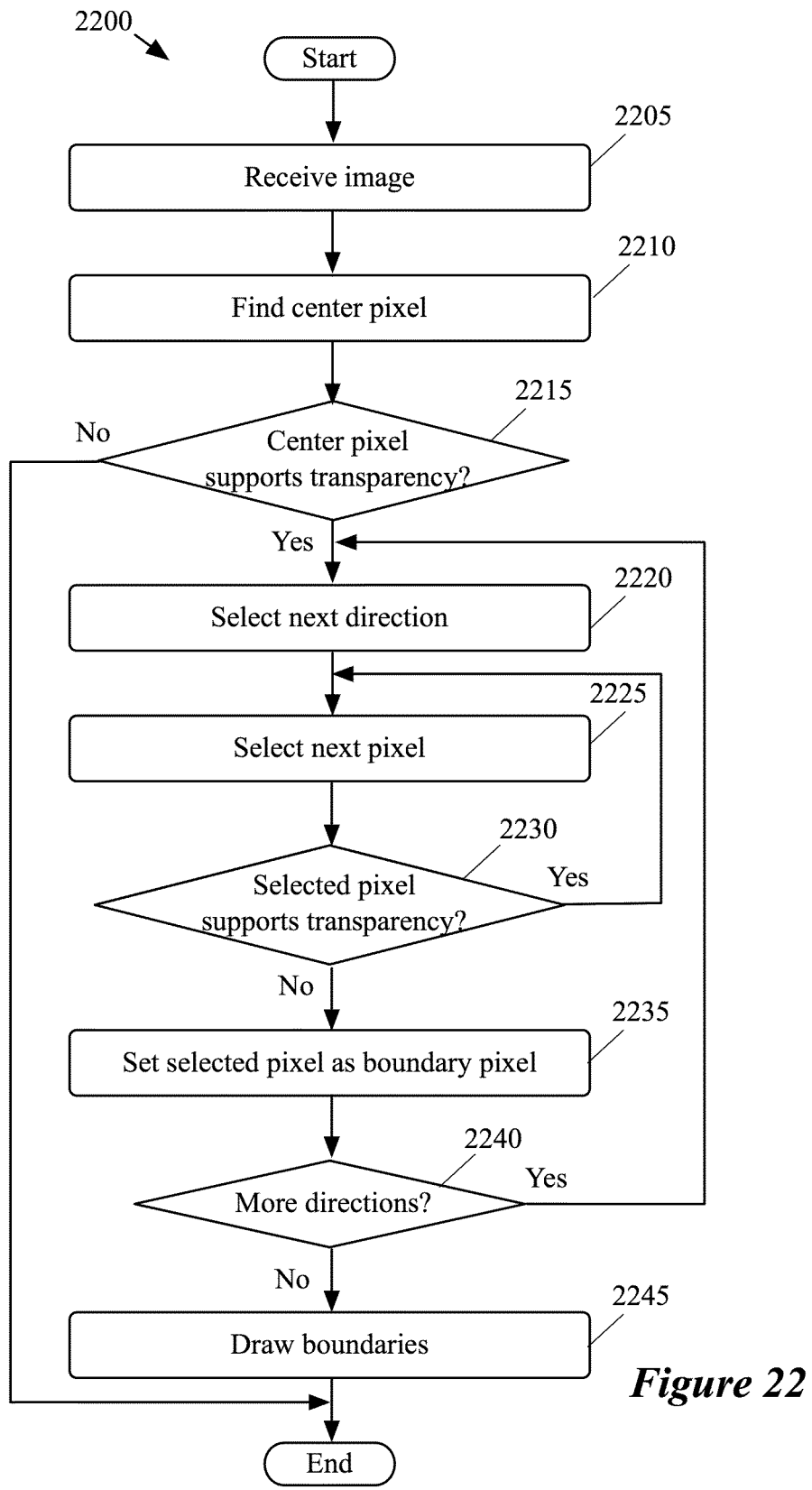
FIG. 22 conceptually illustrates a process that some embodiments performs to detect boundaries of a transparent area within an image.
Figure 23:
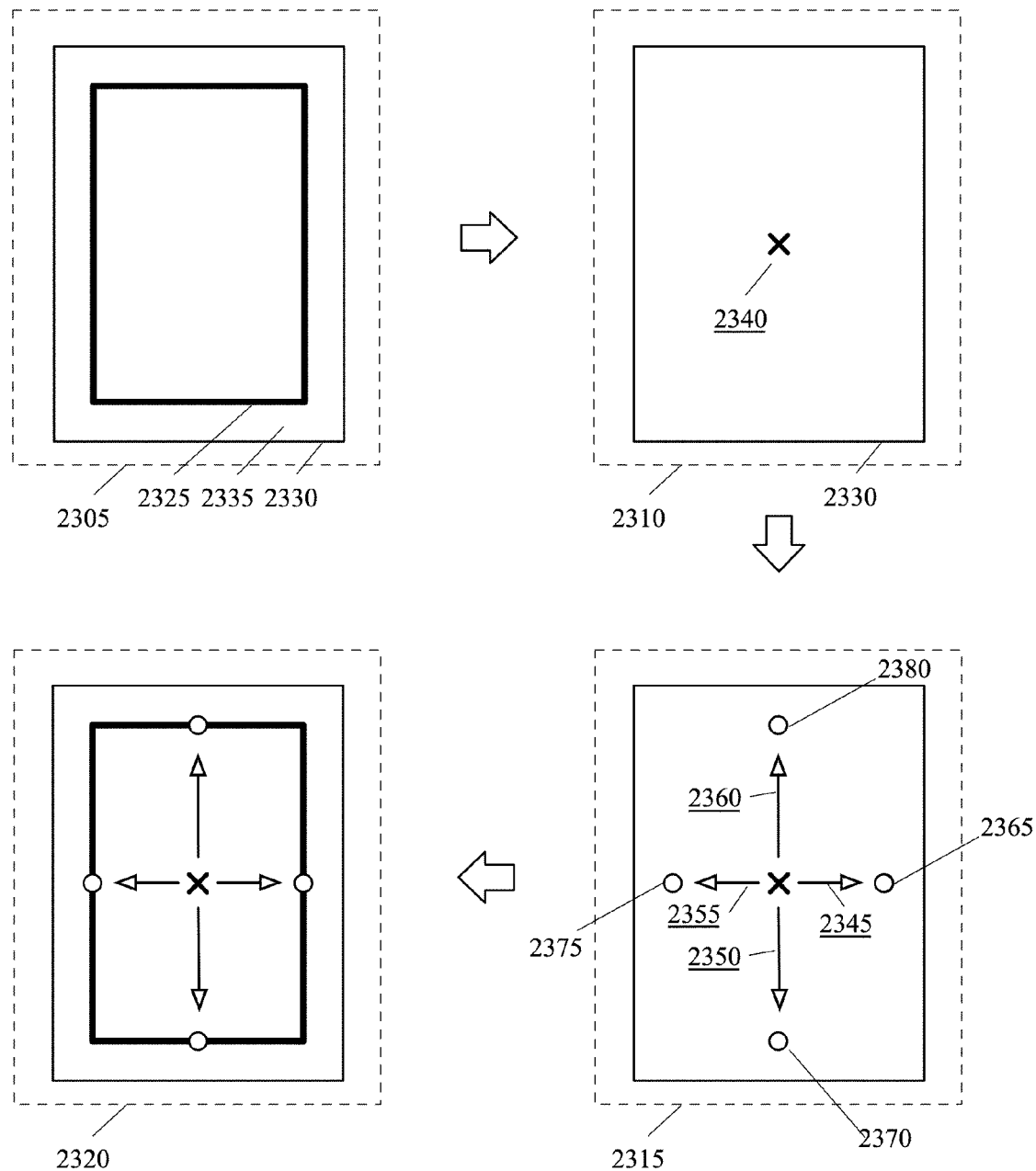
FIG. 23 conceptually illustrates finding boundaries of a transparent area within an image.

FIG. 22 conceptually illustrates a process 2200 that some embodiments performs to detect boundaries of a transparent area within an image. The process 2200 in some embodiments is performed by an authoring platform when a user of the authoring platform creates a scene for the application that is being authored by the authoring platform. The process 2200 may also be performed by an application that is authored by the authoring platform of some embodiments when it renders a scene while the application executes. The process 2200 will be described by reference to FIG. 23. FIG. 23 conceptually illustrates in four different stages finding boundaries of a transparent area within an image.

The process 2200 begins by receiving (at 2205) an image on top of which a scene of the authored application is to be rendered. In some embodiments, the process assumes that the boundaries of the transparent area within the image form a shape that is of the same type but smaller than the shape of the received image. For instance, when the received image is rectangular, the process would find a smaller rectangular shape formed by the transparent area within the received shape.

In some embodiments, the image is in a format (e.g., .png format) that supports transparency. As mentioned above, a pixel of an image in such format can have an alpha value, which, as known in the art, is a value that specifies opacity of the pixel. An alpha value of zero means that the pixel is completely transparent. When a complete transparent pixel is composited with another pixel, the composite pixel will be displayed as if that other pixel alone is displayed. An alpha value of one means the pixel is completely non-transparent.

Therefore, a pixel supports transparency when the pixel has an alpha value (e.g., between 0 and 1). In some cases, not all pixels of an image support transparency.

The first stage 2305 of FIG. 23 shows a rectangular transparent area 2325 within an image 2330. The image 2330 is in a format (e.g., .png format) that supports transparency. Every pixel within the transparent area 2330 has an alpha value of zero. Every pixel in an area 2335 that is outside the transparent area 2325 and inside the image 2330 does not have an alpha value.

Next, the process 2200 identifies (at 2210) the center pixel of the received image. Different embodiments identify the center pixel of the received image differently. For instance, in some embodiments, the process identifies the center pixel by computing the geometric center of the shape that the received image forms. The process then identifies a pixel that is nearest to the geometric center as the center pixel of the image. In other embodiments, the process assigns coordinate values in two-dimensional space (e.g., x and y coordinate values) to each pixel of the image and takes an average (e.g., arithmetic mean) of the values assigned to all pixels of the image. In these embodiments, the process will identify the image with coordinate values that are closest to the average coordinate values. The second stage 2310 of FIG. 23 shows a center pixel 2340 of the image 2330 depicted as an x mark. As mentioned above, the center pixel 2340 has an alpha value.

The process 2200 then determines (at 2215) whether the center pixel of the received image supports transparency. In some embodiments, the process 2200 determines that the center pixel of the received image supports transparency when the center pixel has an alpha value that is less than a certain threshold value that is less than 1.0. For instance, when the center pixel has an alpha value of 0.5 or less, the process 2200 in some embodiments determines that the center pixel supports transparency. When the process 2200 determines (at 2215) that the center pixel does not support transparency, the process ends.

When the process 2200 determines (at 2215) that the center pixel supports transparency, the process in some embodiments proceeds to 2220 to select a direction from the center pixel. As mentioned above, the process in some embodiments assumes that the type of shape that the received image forms is the type of shape that the transparent area forms. The process selects a direction based on the type of shape that the transparent area would form. For instance, when the received image is rectangular, the process would select one of four perpendicular directions to find the four edges of the rectangular shape that the transparent area would form within the received image. The third stage 2315 of FIG. 23 shows four perpendicular directions 2345, 2350, 2355, and 2360 depicted as arrows pointing away from the center pixel 2340.

Next, the process 2200 selects (at 2225) the next pixel in the selected direction. The process 2200 then determines (at 2230) whether the selected pixel supports transparency. When the process 2200 determines (at 2230) that the selected pixel does not support transparency, the process 2200 loops back to 2225 to select the pixel that is next to the currently selected pixel in the selected direction. When the process 2200 determines (at 2230) that the selected pixel does not support transparency, the process 2200 sets (at 2235) the selected pixel as a boundary pixel, which the process will use to draw a boundary. Next, the process 2200 determines (at 2240) whether there are more directions from the center pixel in which to examine pixels to find boundaries. When the process 2200 determines (at 2240) that there are more directions in which to examine pixels to find boundaries, the process loops back to 2220 to select another direction. The third stage 2315 of FIG. 23 shows four pixels 2365, 2370, 2375, and 2380 depicted as hollow circles. The pixels 2365-2380 are the first pixels that do not have an alpha value in the directions 2345-2360, respectively.

When the process 2200 determines (at 2240) that there are no more directions in which to examine pixels to find boundaries, the process 2200 proceeds to 2245 to draw boundaries based on the boundary pixels set at 2235. For instance, the process 2200 would draw a rectangular shape based on the four boundary pixels that the process would have set at 2235. The fourth stage 2320 of FIG. 23 shows a rectangular shape drawn based on the pixels 2365-2380. The process 2200 identifies the pixels forming the drawn boundaries as pixels that define the boundaries of the transparent area.

The specific operations of the process 2200 may not be performed in the exact order shown and described. The specific operations may not be performed in one continuous series of operations, and different specific operations may be performed in different embodiments. Furthermore, the process could be implemented using several sub-processes, or as part of a larger macro process. For instance, the process 2200 does not have to find and set a boundary pixel for one selected direction at a time. Moreover, the process 2200 is described in the context of having received a rectangular image. However, one of the ordinary skill in the art will realize that the process 2200 would be applicable for finding boundaries of other types of shapes (e.g., a triangular shape, an pentagonal shape, and other polygonal shapes, etc.).

Also, the process 2200 in some embodiments detects boundaries of a transparent area by expanding the boundaries from the determined center pixel in certain directions. Alternatively, or conjunctively, the process in some embodiments expands the boundaries by recursively examining all neighboring pixels of the already examined pixels. That is, the process may examine the neighboring pixels of the determined center pixel to see whether the neighboring pixels are transparent and then include those pixels within the boundaries. The process repeats these operations until all contiguous transparent pixels are included within the expanding boundaries. Moreover, the process in some embodiments may not expand the boundaries from the determined center pixel. For instance, the process may select a pixel from the received image, determine whether the pixel supports transparency and is transparent, and then expand the boundaries of the transparent area from that pixel.

V. Authoring Platform Architecture

Figure 24:
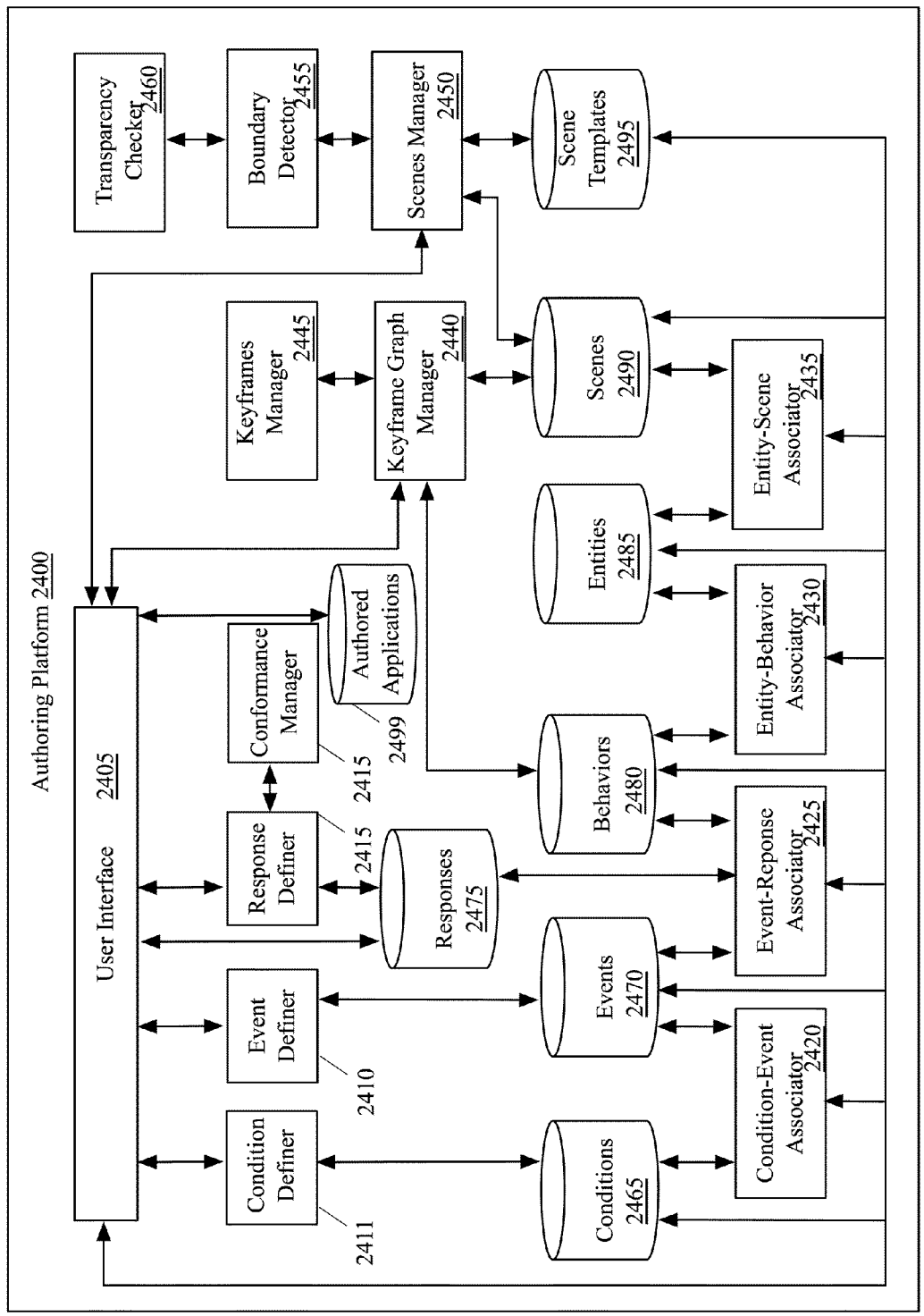
FIG. 24 illustrates the software architecture of an authoring platform for building applications.

FIG. 24 illustrates the software architecture of an authoring platform 2400 for building applications. As shown, the authoring platform of some embodiments includes a user interface 2405, an event definer 2410, a conditions definer 2411, a response definer 2415, a condition-event associator 2420, an event-response associator 2425, an entity-behavior associator 2430, an entity-scene associator 2435, a key-indexed graph manager 2440, a key indices manager 2445, a scene preview area manager 2450, a boundary detector 2455, and a transparency checker 2460. The authoring platform also includes a conditions repository 2465, an events repository 2470, a responses repository 2475, a behaviors repository 2480, an entities repository 2485, a scenes repository 2490, and a scene templates repository 2495, and a build application repository 2499.

The authoring platform 2400 provides the user with the user interface 2405 through which the user can input data for authoring the application. The user interface 2405 is similar to the user interface 205 of FIG. 2. Through the user interface 2405, the user can specify events and responses and associate the events and responses. In addition, the user also can specify conditions for an event to trigger responses associated with the event. The user can also specify entities for scenes of an interactive application. The user interface 2405 sends the received input data to other modules of the authoring platform 2400. For instance, the user interface 2405 sends the received data to the event definer 2410 and the response definer 2415.

The event definer 2410 defines events based on the received data. The event definer 2410 is similar to the event definer 210 of FIG. 2, in that the event definer 2410 creates an event based on the received data. For instance, based on the received data, the event definer creates an event that encapsulates an application user's touching multiple locations of a scene. The event definer 2410 stores the defined events in the events repository 2470, which is a cache or other persistent storage medium in some embodiments.

The conditions definer 2411 defines conditions based on the received data. The user of the authoring platform specifies conditions through the user interface 2405. For instance, the user interface may provide the predicate editor 1505 of Figure Q. As described above, conditions are associated with an event such that the event can trigger responses only if the conditions associated with the event are satisfied when the authored application is running. Conditions can be added to a predefined event or an event defined by the authoring platform user. As mentioned above, the authoring platform 2400 in some embodiments provides predefined events. Examples of pre-defined events include a touchdown event, a touchup event, etc. The conditions definer 2412 stores the defined conditions in the conditions repository 2465, which is a cache or other persistent storage medium in some embodiments.

The response definer 2415 is similar to the response definer 215 of FIG. 2 in that the response definer 2415 defines different types responses based on the received data and defines response handlers for these different types of responses. The response definer 2415 stores defined responses and response handlers in the responses repository 2475, which is cache or other persistent storage medium in some embodiments. In addition, similar to the response definer 215, the response definer 2415 uses the conformance manager 2416 to define different types of responses in such a way that the responses of different types can communicate with each other. Moreover, in some embodiments, the authoring platform 2400 includes the response definer 2415 for each of the different types of responses so that each response definer 2415 defines response(s) of one type.

The condition-event associator 2420 associates an event with one or more conditions based on the received data. For instance, the condition-event associator 2420 associates a condition that the user specified through the predicate editor 1505 of Figure Q with a touchdown event. The condition-event associator 2420 stores data specifying associations of events and conditions either in the conditions repository 2465 or in the events repository 2470. That is, in some embodiments a condition may have a reference to the event with which the condition is associated. An event may also have references to conditions with which the event is associated. Or, both events and conditions have references to each other.

The event-response associator 2425 is similar to the event-response associator 230 in that the event-response defines behaviors by associating each event with one or more responses based on the received data. As mentioned above, an event may be associated with responses of different types. The event-response associator 2425 stores defined behaviors in the behaviors repository 2480, which is cache or other persistent storage medium in some embodiments.

The entity-behavior associator 2435 is similar to the entity-behavior associator 240 of Figure A in that the entity-behavior associator 2435 associates an entity with one or more behaviors per user's specification. As mentioned above, entities are graphical objects The entity-behavior associator 2435 of some embodiments stores the associations of behaviors and entities in the entities repository 2485, which is a cache or other persistent storage medium in some embodiments. In some embodiments, an entity has references to the behaviors that are associated with the entity. A behavior may have references to entities that are associated with the behavior. In some embodiments, one behavior may be associated with one or more entities.

The entity-scene associator 2435 associates entities with scenes. For instance, when a user drops an entity on a scene through the user interface 2405, the entity-scene associator 2435 associates the entity with the scene. The entity-scene associator 2435 stores data specifying associations of entities and scenes either in the entities repository 2485 or in the scenes repository 2490. That is, in some embodiments an entity may have a reference to the scene that is associated with the entity. The scene may also have references to entities that are associated with the scene. Or, both entities and scenes may have references to each other. The scenes repository 2490, which is a cache or other persistent storage medium in some embodiments, stores scenes that may become part of authored applications. The authored applications are stored in the authored applications repository 2499, which is cache or other persistent storage medium in some embodiments.

The key-indexed graph manager 2440 manages key-indexed graphs for entities of scenes. The key-indexed graph manager 2440 receives user inputs through the user interface 2405 and creates and/or modifies key-indexed graphs for the entities of the scenes. The key-indexed graph manager 2440 retrieves scenes from the scenes repository 2490. The key-indexed graph manager 2440 also uses the key indices manager 2445 to create and/or modify key indices for the entities of the scenes.

The scenes manager 2450 manages scenes. The scenes manager 2450 creates and/or modifies scenes based on the user's inputs. For instance, the scenes manager 2450 creates a scene with a scene template that the user has chosen. The scene templates in some embodiments are images provided by a manufacturer of a device on which an application authored by the authoring platform 2400 would execute. As described above, such images support transparency. The scene templates may be stored in the scene templates repository 2495, which is a cache or other persistent storage medium in some embodiments. The scenes manager 2450 in some embodiments uses the boundary detector 2455 to identify boundaries of transparent areas within the scene templates. The boundary detector 2455 in some embodiments uses the transparency checker 2460 to determine whether pixels of the scene templates support transparency. As mentioned above, a pixel with an alpha value supports transparency.

VI. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 25:
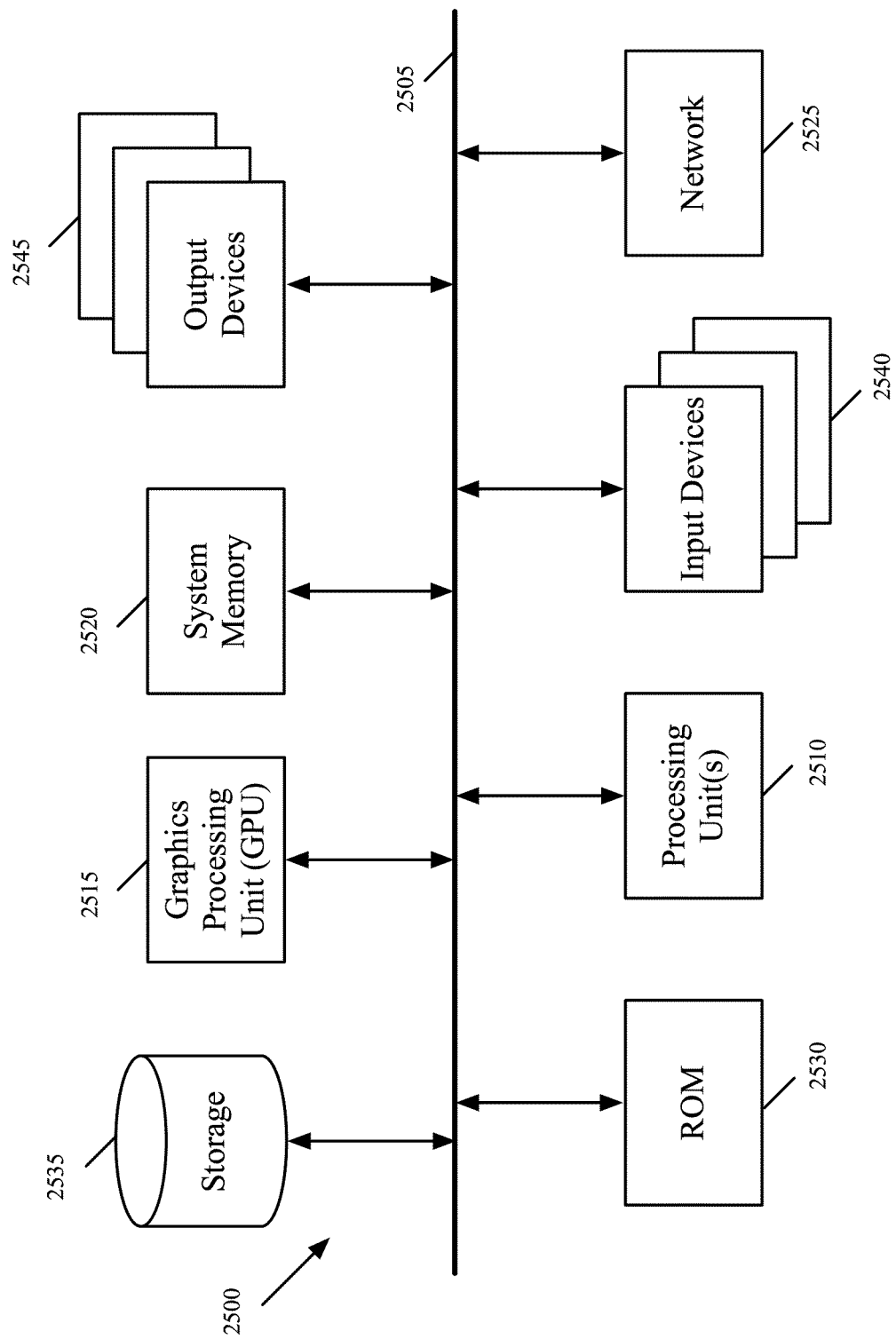
FIG. 25 conceptually illustrates an electronic system with which some embodiments of the invention are implemented.

FIG. 25 conceptually illustrates an electronic system 2500 with which some embodiments of the invention are implemented. The electronic system 2500 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2500 includes a bus 2505, processing unit(s) 2510, a graphics processing unit (GPU) 2515, a system memory 2520, a network 2525, a read-only memory 2530, a permanent storage device 2535, input devices 2540, and output devices 2545.

The bus 2505 collectively represents all system, peripheral, and chipset buses that communicatively connect the numerous internal devices of the electronic system 2500. For instance, the bus 2505 communicatively connects the processing unit(s) 2510 with the read-only memory 2530, the GPU 2515, the system memory 2520, and the permanent storage device 2535.

From these various memory units, the processing unit(s) 2510 retrieves instructions to execute and data to process in order to execute the processes of the invention. The processing unit(s) may be a single processor or a multi-core processor in different embodiments. Some instructions are passed to and executed by the GPU 2515. The GPU 2515 can offload various computations or complement the image processing provided by the processing unit(s) 2510. In some embodiments, such functionality can be provided using CoreImage's kernel shading language.

The read-only-memory (ROM) 2530 stores static data and instructions that are needed by the processing unit(s) 2510 and other modules of the electronic system. The permanent storage device 2535, on the other hand, is a read-and-write memory device. This device is a non-volatile memory unit that stores instructions and data even when the electronic system 2500 is off. Some embodiments of the invention use a mass-storage device (such as a magnetic or optical disk and its corresponding disk drive) as the permanent storage device 2535.

Other embodiments use a removable storage device (such as a floppy disk, flash memory device, etc., and its corresponding disk drive) as the permanent storage device. Like the permanent storage device 2535, the system memory 2520 is a read-and-write memory device. However, unlike storage device 2535, the system memory 2520 is a volatile read-and-write memory, such as random access memory. The system memory 2520 stores some of the instructions and data that the processor needs at runtime. In some embodiments, the invention's processes are stored in the system memory 2520, the permanent storage device 2535, and/or the read-only memory 2530. For example, the various memory units include instructions for processing multimedia clips in accordance with some embodiments. From these various memory units, the processing unit(s) 2510 retrieves instructions to execute and data to process in order to execute the processes of some embodiments.

The bus 2505 also connects to the input and output devices 2540 and 2545. The input devices 2540 enable the user to communicate information and select commands to the electronic system. The input devices 2540 include alphanumeric keyboards and pointing devices (also called "cursor control devices"), cameras (e.g., webcams), microphones or similar devices for receiving voice commands, etc. The output devices 2545 display images generated by the electronic system or otherwise output data. The output devices 2545 include printers and display devices, such as cathode ray tubes (CRT) or liquid crystal displays (LCD), as well as speakers or similar audio output devices. Some embodiments include devices such as a touchscreen that function as both input and output devices.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

Finally, as shown in FIG. 25, bus 2505 also couples electronic system 2500 to a network 2525 through a network adapter (not shown). In this manner, the computer can be a part of a network of computers (such as a local area network ("LAN"), a wide area network ("WAN"), or an Intranet, or a network of networks, such as the Internet. Any or all components of electronic system 2500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4, 12, 13, 13, 20, and 22) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. An authoring system for building an application having a set of graphical objects, the authoring system comprising:
a computer processor; and
a memory containing instructions that, when executed, cause the computer processor to:
receive a first input defining a first operation that is to be performed on a first graphical object of the application, wherein the first operation, when performed, results in a first output in a first format;
receive a second input defining a second operation that is to be performed on a second graphical object of the application, wherein:
the second operation is different than the first operation, and
the second operation requires input parameters in a second format, different than the first format, to perform the second operation;
receive a third input involving a user gesture of dragging and dropping the first graphical object onto the second graphical object, thereby automatically associating the first operation performed on the first graphical object with the second operation performed on the second graphical object; and
generate the application such that the second operation is performed according to the first output of the first operation.

2. The authoring system of claim 1, wherein the instructions further cause the computer processor to:
present a graphical user authoring interface enabling a user to specify inputs to build the application, wherein the first input, second input and third input are received as a result of user interaction with the graphical user authoring interface.

3. The authoring system of claim 1, wherein the first input further defines a first user interaction event, wherein, when the application is executed, detection of the first user interaction event causes performance of the first operation.

4. The authoring system of claim 1, wherein the first operation comprises at least one selected from a group consisting of animating the first graphical object, running a script, executing a compiled code and playing back an audio file.

5. The authoring system of claim 1, wherein the second graphical object is the first graphical object.

6. The authoring system of claim 1, further comprising a conformance module configured to determine that the second format does not match the input parameters and to convert the input parameters in a second format into a conformance protocol and convert the first output in a first format into input parameters in the conformance protocol.

7. A computer-implemented method for building an application having a set of graphical objects, the method comprising:
receiving, by a computer processor, a first input defining a first operation that is to be performed on a first graphical object of the application, wherein the first operation, when performed, results in a first output in a first format;
receiving, by the computer processor, a second input defining a second operation that is to be performed on a second graphical object of the application, wherein:
the second operation is different than the first operation, and
the second operation requires input parameters in a second format, different than the first format, to perform the second operation;
receiving, by the computer processor, a third input involving a user gesture of dragging and dropping the first graphical object onto the second graphical object, thereby automatically associating the first operation performed on the first graphical object with the second operation performed on the second graphical object; and
generating, by the computer processor, the application such that the second operation according to the first output of the first operation.

8. The computer-implemented method of claim 7, further comprising:
presenting a graphical user authoring interface enabling a user to specify inputs to build the application, wherein the first input, second input and third input are received as a result of user interaction with the graphical user authoring interface.

9. The computer-implemented method of claim 7, wherein the first input further defines a first user interaction event, wherein, when the application is executed, detection of the first user interaction event causes performance of the first operation.

10. The computer-implemented method of claim 7, wherein the first operation comprises at least one selected from a group consisting of animating the first graphical object, running a script, executing a compiled code and playing back an audio file.

11. The computer-implemented method of claim 7, wherein the second graphical object is the first graphical object.

12. The computer-implemented method of claim 7, further comprising:
    determining, using a conformance module, that the second format does not match the input parameters; and
    converting the input parameters in a second format into a conformance protocol and convert the first output in a first format into input parameters in the conformance protocol.

13. A non-transitory computer-readable medium containing instructions for building an application having a set of graphical objects, the instructions, when executed by a computing device, cause the computing device to:
    receive a first input defining a first operation that is to be performed on a first graphical object of the application, wherein the first operation, when performed, results in a first output in a first format;
    receive a second input defining a second operation that is to be performed on a second graphical object of the application, wherein:
        the second operation is different than the first operation, and
        the second operation requires input parameters in a second format, different than the first format, to perform the second operation;
    receive a third input involving a user gesture of dragging and dropping the first graphical object onto the second graphical object, thereby automatically associating the first operation performed on the first graphical object with the second operation performed on the second graphical object; and
    generate the application such that the second operation according to the first output of the first operation.

14. The non-transitory computer-readable medium of claim 13, wherein the instructions further cause the computing device to:
    present a graphical user authoring interface enabling a user to specify inputs to build the application, wherein the first input, second input and third input are received as a result of user interaction with the graphical user authoring interface.

15. The non-transitory computer-readable medium of claim 13, wherein the first input further defines a first user interaction event, wherein, when the application is executed, detection of the first user interaction event causes performance of the first operation.

16. The non-transitory computer-readable medium of claim 13, wherein the first operation comprises at least one selected from a group consisting of animating the first graphical object, running a script, executing a compiled code and playing back an audio file.

17. The non-transitory computer-readable medium of claim 13, wherein the second graphical object is the first graphical object.

18. The non-transitory computer-readable medium of claim 13, wherein the instructions further cause the computing device to call a conformance module configured to determine that the second format does not match the input parameters and to convert the input parameters in a second format into a conformance protocol and convert the first output in a first format into input parameters in the conformance protocol.

* * * * *